US012695502B1

(12) United States Patent
Calder

(10) Patent No.: US 12,695,502 B1
(45) Date of Patent: Jul. 28, 2026

(54) SATELLITE SYSTEM USING CLOUD COMPUTING VIRTUALIZED GATEWAYS, RADIO TRANSPORT PROTOCOL AND GROUND TO SPACE OPTICAL FEEDER LINKS

(71) Applicant: Alasdair Bruce Calder, Gaithersburg, MD (US)

(72) Inventor: Alasdair Bruce Calder, Gaithersburg, MD (US)

(73) Assignee: Alasdair Bruce Calder, Gaithersburg, MD (US)

( * ) Notice: Subject to any disclaimer, the term of this patent is extended or adjusted under 35 U.S.C. 154(b) by 286 days.

(21) Appl. No.: 18/651,920

(22) Filed: May 1, 2024

Related U.S. Application Data

(60) Provisional application No. 63/463,268, filed on May 1, 2023.

(51) Int. Cl.
| | |
|---|---|
| *H04B 7/185* | (2006.01) |
| *H04B 7/204* | (2006.01) |
| *H04B 10/112* | (2013.01) |

(52) U.S. Cl.
CPC ......... *H04B 7/2041* (2013.01); *H04B 10/112* (2013.01)

(58) Field of Classification Search
CPC .... H04B 7/2041; H04B 10/112; H04B 7/185; H04B 7/18528; H04B 7/18595; H04B 10/11; H04B 7/04026; H04B 7/0897; H04B 7/155
See application file for complete search history.

(56) References Cited

U.S. PATENT DOCUMENTS

| | | | |
|---|---|---|---|
| 10,142,021 B2 | 11/2018 | Turgeon et al. | |
| 11,296,781 B2 | 4/2022 | Calder et al. | |
| 11,652,539 B2 * | 5/2023 | Calder | H04W 16/28 |
| | | | 455/12.1 |
| 2018/0019816 A1 * | 1/2018 | Wang | H04B 7/18539 |
| 2019/0028197 A1 * | 1/2019 | Turner | H04B 7/195 |
| 2019/0109635 A1 * | 4/2019 | Buer | H04B 7/2041 |
| 2019/0115975 A1 * | 4/2019 | Freedman | H04B 7/19 |
| 2019/0253131 A1 * | 8/2019 | Buer | H04B 7/18513 |
| 2020/0169323 A1 * | 5/2020 | Moro | H04B 7/2041 |
| 2021/0391911 A1 * | 12/2021 | Hoydis | H04B 7/0695 |
| 2021/0391919 A1 * | 12/2021 | Calder | H04B 7/0617 |
| 2021/0391920 A1 * | 12/2021 | Calder | H04L 27/2649 |

(Continued)

OTHER PUBLICATIONS

AWS, "Overview of Amazon Web Services", AWS Whitepaper, 72 pages, Aug. 11, 2020.

(Continued)

*Primary Examiner* — Andrew Wendell

(57) ABSTRACT

A satellite system uses cloud computing virtualized gateways, radio transport protocol and space to ground optical communications to improve wireless communication. A digitized ground based subsystem for use with the satellite system can be employed in transmitting an optical feeder uplink beam to a communications platform that includes a multiple element antenna array. The ground based subsystem is configured to receive the optical feeder uplink beam and, in dependence thereon, use the multiple element antenna feed array to produce and transmit a plurality of RF service downlink beams to a single or plurality of service terminals.

20 Claims, 5 Drawing Sheets

(56) References Cited

U.S. PATENT DOCUMENTS

| | | | | |
|---|---|---|---|---|
| 2022/0345210 A1* | 10/2022 | Palermo | ............. | H04B 7/18584 |
| 2023/0072900 A1* | 3/2023 | Scott | ........................ | H04B 7/19 |
| 2023/0109635 A1* | 4/2023 | Palermo | ............. | H04B 7/18519 |
| | | | | 455/13.1 |

OTHER PUBLICATIONS

Cooklev et al., "The VITA 49 Analog RF-Digital Interface", IEEE Circuits and Systems Magazine, Fourth Quarter, pp. 21-32, 2012.
European Commission, "VERy high Throughput Satellite-Ground Optical Link", Fact Sheet, CORDIS project, Horizon 2020, https://cordis.europa.eu/project/id/822030, 9 pages, Jun. 1, 2019.
Giggenbach et al., "Preliminary Results of Terabit-per-second Long-Range Free-Space Optical Transmission Experiment THRUST", Proc. of SPIE, 9647-21, 13 pages, 2015.
Hosking, Rodger, "VITA 49 Radio Transport: The new software radio protocol", Military Embedded Systems, https://militaryembedded.com/comms/sdr/vita-radio-software-radio-protocol, 10 pages, Apr. 6, 2021.
Kratos, "Transforming the Ground Enterprise with SpectralNet™ IF Transport", 8 pages, 2015.
Mata-Calvo et al., "Optical Feeder Links for Very High Throughput Satellites—System Perspectives", IEEE International Conference on Space Optical Systems and Applications (ICSOS), 11 pages, 2015.
MATLAB—Deep Learning eBook, MathWorks, 15 pages, Mar. 2021.
MATLAB—Model-Based Design for Embedded Control Systems, Mathworks, 14 pages, Oct. 2020.
Normoyle et al., "The VITA Radio Transport as a Framework for Software Definable Radio Architectures", SDR 08 Technical Conference and Product Exposition, 7 pages, 2008.
Saathof et al., "Adaptive optics pre-correction for optical feeder links: breadboard performance", International Conference on Space Optics—ICSO, Proc. of SPIE, vol. 11180, 111802D-1, Downloaded From: https://www.spiedigitallibrary.org/conference-proceedings-of-spie on Apr. 6, 2021, 9 pages, Oct. 2018.
Teledyne E2V—EV12DD700 Datasheet, Dual Channel Ka-band capable 12GSps DAC Space Grade, DS 60S 218408 (A.3), pp. 1-112, Sep. 2020.
VERTIGO—Press Release—"Very High Throughput Satellite—Ground Optical Feeder Link", 822030 VERTIGO, Ref No. 0003-0002592815, 10 pages, Feb. 26, 2020.

* cited by examiner

SATELLITE SYSTEM USING CLOUD COMPUTING VIRTUALIZED GATEWAYS, RADIO TRANSPORT PROTOCOL AND GROUND TO SPACE OPTICAL FEEDER LINKS

CROSS REFERENCE TO RELATED APPLICATIONS

This application claims priority under 35 U.S.C. § 119 to provisional patent application U.S. Ser. No. 63/463,268, filed May 1, 2023. The provisional patent application is herein incorporated by reference in its entirety, including without limitation, the specification, claims, and abstract, as well as any figures, tables, appendices, or drawings thereof.

FIELD OF THE INVENTION

The present invention relates generally to an apparatus and/or corresponding method of use in at least the communications, aerospace, and cloud computing industries. More particularly, but not exclusively, the present invention relates to a satellite system using cloud computing virtualized gateways, radio transport protocol and space to ground optical communications.

BACKGROUND OF THE INVENTION

The background description provided herein gives context for the present disclosure. Work of the presently named inventor, as well as aspects of the description that may not otherwise qualify as prior art at the time of filing, are neither expressly nor impliedly admitted as prior art.

As the need for high bandwidth satellite communications continuously increases so does the need for greater flexibility in delivering the communications services in the manner that best suites the applications supported and associated customer requirements. Satellite communications architectures suffer from several problems with their implementations and critically from an inflexibility that leads to the inability to maximize the efficiency of the end-to-end satellite communication resource. With current architectures it is extremely difficult to contract one-hundred percent (100%) of the available radio frequency (RF) spectrum and/or power on a satellite with the customer base (especially with HTS, VHTS and UHTS), but crucially these systems prohibit achieving anywhere near high levels of satellite communications resource utilization as multiple segments of all sizes can lie dormant for frequent and/or extensive periods while the end customers no longer use the assets. This represent two fundamental issues, firstly the customer pays for an asset that they neither utilize completely or fully need, and secondly there are no effective solutions or technologies to significantly increase the overall satellite communications resource utilization across a varied and varying customer base. This situation further suffers when specific customers wish the ability to modify their contracted satellite communications resources in a dynamic, scheduled and/or ad-hoc sporadic manner, to no avail.

This problem is further exacerbated by the fact that satellite communications cover huge geographic areas, which means that its 'last-mile' segment (satellite-subscriber terminal) can capture huge customer numbers, segments and/or applications, representing a huge, stymied demand. This stymied demand is represented by different customer segments with differing applications of varying network configurations, beam laydowns and coverage, demand schedules, satellite baseband air interface types, and/or associated remote end subscriber terminal support. Current technology suffers from the inability to flexibly manage and operate effectively and efficiently across a customer base representing unique segments requiring network bandwidth in different places, in different times, and/or in differing formats.

Such inflexibility is caused by current architectural issues in both the ground and space segment components.

Current gateway architectures are highly dependent on vast implementations of multiple bespoke, vendor proprietary dedicated hardware infrastructure. Many of which are non-interoperable and all of which operate significant portions within the hardware analog RF domain to transmit signals internally and externally of the gateway. This leads to a highly fractalized or stove-piped infrastructure that is cumbersome, inflexible, and exceedingly difficult to operate, maintain, upgrade, augment and/or reconfigure at short notice and/or in a dynamic manner.

Current architectures utilize gateway-satellite links that are operated in the analog RF domain, one of the few communications infrastructures left that operates the middle-mile (gateway-satellite) in a restrictive analog domain.

The analog RF domain is an extensive and inherently hard-coded environment to operate within and satellite communications suffers from restricting the analog RF domain solely to the last-mile (satellite-subscriber terminal).

The RF gateway-satellite feeder link architectures require many concurrent geographically dispersed gateways to support high throughput satellites (HTS), very high throughput satellites (VHTS) and ultra-high throughput satellites (UHTS). Even the availability of 5 GHz at V band, and dual polarization, a satellite with terabit/second (Tbps) capacity would need between forty (40) and seventy (70) gateways depending on spectral efficiency achieved, as described in the conference paper titled "Optical Feeder Links for VHTS-System Perspectives", by Mata-Calvo et al. (Conference Proceedings of the Ka Band Communications, Navigation and Earth Observation Conference 2015. Ka Conference 2015, 12-14 Oct. 2015, Bologna Italy). Note that Q/V band and Ka band gateways typically require additional resiliency and redundancy implementations to achieve high availability.

Satellite communications offer large swath views of the Earth's surface provides an ideal platform for beamforming and the laydown of capacity. Emerging and developing high-throughput satellite communications beamforming technologies are focusing on satellite onboard processing hardware where the beamforming computational burden is placed on the satellite (or a mixture of ground and onboard computational burden) and hard-coded on the satellite for the duration of the mission, which can run anywhere up to fifteen to twenty (15-20) years or higher. However, the ground systems architectures, technologies, and management systems are not optimized for the onboard systems to maximize return and functionality.

Such onboard satellite communications beamforming systems rely on the hard-coded gateway implementations, gateway hardware RF stove piping, analog RF gateway to satellite feeder links, and/or extensive and complex RF componentry onboard the satellite. Further, the onboard satellite communication beamforming systems do not support the complex issues of integration with the higher layers (OSI Layer 2 and above) of multiple and/or dynamic satellite baseband air interface operations of today let alone those of the future.

The satellite communications industry has developed a multi-vendor ecosystem through multiple satellite operators, service providers and/or satellite baseband air interface systems. Although this open-system approach enables multi-application and multi-vendor markets that delivers innovation and competition, it suffers from the hard-coded ecosystems that restrict the ability to holistically view, utilize, adapt, and maximize the return on available satellite communications resource such as RF spectrum, power, human resource, space and/or ground investments. Additionally, current technology does not allow implementations that deliver the ability to holistically view, utilize, adapt, coordinate, and maximize the return on available satellite communications resource across multiple satellites owned and operated by a single and/or multiple satellite operators.

U.S. Pat. No. 10,142,021 proposes a solution to some of the multiple RF gateway and onboard processing issues by utilizing an optical feeder link between the gateway and satellite and placing the beamforming burden on the ground with a ground based beamforming system (GBBF). However, it suffers from multiple limitations and problems, such as:

expanding the rigid, inflexible, costly, and cumbersome hard-coded and stove-piped gateway environment and implementations;

operation in the analog domain within the middle-mile;

requiring extensive and inflexible hard-coded GBBF hardware and gateway analog RF to optical conversion hardware;

requiring the utilization of much higher power demanding analog RF modulated optical terminal system (gateway and satellite);

requiring complex, extensive and highly lossy analog RF chains on board the satellite;

providing no effective operational system to manage multiple optical gateways to provide high availability. Even though optical feeder links provide vastly greater capacity when compared to RF variants even in Q/V band, there is still a need to compensate link blockage by clouds through optical feeder link diversity. By analysis of long-term cloud data, it can be shown that in the Mediterranean, around eleven (11) gateway stations can be sufficient to fulfill availability requirements for satellite communications systems, while this number can even be reduced when an inter-hemispherical ground network exploiting anti-correlated seasonal weather statistics, as described in the paper titled "Preliminary Results of Terabit-per-second Long-Range Free-Space Optical Transmission Experiment THRUST", by Giggenbach et al. (Proc. of SPIE 9647-21, 2015). Resiliency and redundancy suffer heavily when multiple hardware gateways must be exactly matched with hard-coded stove-piped configurations resulting in costly implementations that are impossible to modify in a real-time environment and entail complex coordination for any required systems upgrades;

offers no solution to support multi satellite baseband air interface operation; and operation only with an extensive hardware dependent fractalized gateway infrastructure including hard-coded satellite baseband air interface systems.

U.S. Patent No. U.S. Pat. No. 11,296,781 proposes a solution to the multiple RF gateway, gateway resiliency, and onboard processing issues by utilizing an optical feeder link between the gateway and satellite and placing the beamforming burden on the ground with a virtualized on-ground beamforming (VOGB). However, if the satellite is equipped with sufficient onboard processing capability to meet the mission and beamforming requirements, then the need for the VOGB can be eliminated.

Several ground to space Terabit per second (Tbps) optical feeder link technologies that operate within the digital domain are currently in process. These technologies only provide a baseband link from the gateway to the satellite (e.g., raw Internet Protocol (IP) user data between the gateway and the satellite). As such, they suffer from multiple limitations and problems, such as:

no comprehensive integration of onboard satellite baseband air interface, or multiple and/or dynamic satellite baseband air interface support;

lack of onboard scalability and flexibility in matching satellite baseband air interface functions with beamforming laydown functions;

no holistic, comprehensive and/or effective management of end-to-end satellite communications resource such as RF spectrum, power, space and/or ground investments;

inability to holistically view, utilize, adapt, coordinate, and maximize the return on available satellite communications resource either across the satellite or multiple satellites owned and operated by a single and/or multiple satellite operators;

Lack the ability to support multi-RF band operation for the last mile (satellite to subscriber terminal); and Lack the ability to exploit the full capability of digitized RF technologies.

Thus, there exists a need in the art for satellite communications services that can be delivered via a highly flexible, scalable, dynamic, interchangeable, and easily adaptable end-to-end architecture.

SUMMARY OF THE INVENTION

The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is a primary object, feature, and/or advantage of the present invention to improve on or overcome the deficiencies in the art.

It is a further object, feature, and/or advantage of the present invention to simultaneously accommodate and satisfy the multiple demands of multiple applications and multiple customer types in a dynamic environment.

It is still yet a further object, feature, and/or advantage of the present invention to deliver effective interoperability of ground systems and space segment in highly dynamic, volatile, uncertain, complex and/or disruptive environments.

It is still yet a further object, feature, and/or advantage of the present invention to quickly, easily and/or automatically adapt and morph to meet real-time changing demands.

It is still yet a further object, feature, and/or advantage of the present invention to enable the visibility, operation, management and reporting of the entire satellite communications resource holistically across a single satellite and/or multiple satellites under a single or multiple of satellite owner operators.

It is still yet a further object, feature, and/or advantage of the present invention to improve inter-coordination performance between satellites.

It is still yet a further object, feature, and/or advantage of the present invention to provide cost-effective and flexible multi-RF band satellite support.

It is still yet a further object, feature, and/or advantage of the present invention to decrease product development cycles and cost.

It is still yet a further object, feature, and/or advantage of the present invention to enable feature augmentation and performance improvements in a software virtual environment without major and/or frequent hardware upgrades and capital investment.

It is still yet a further object, feature, and/or advantage of the present invention to provide a platform to add new features and capabilities incrementally and frequently within an agile DevOps or DevSecOps environment.

It is still yet a further object, feature, and/or advantage of the present invention to provide a solid software defined test and development environment that allows quick and easy transition to the beta and operational phases smoothly and quickly with minimal impact to existing operational services.

It is still yet a further object, feature, and/or advantage of the present invention to provide an effective interface for advanced control and monitoring such as artificial intelligence and or machine learning algorithms. The advanced control and monitoring should minimize the obsolescence and maximize the futureproofing of both the space hardware and ground segment investment.

It is still yet a further object, feature, and/or advantage of the present invention to provide a higher level of flexibility in satellite (platform) user beam laydown options and performance.

It is still yet a further object, feature, and/or advantage of the present invention to be able to reconfigure a completely virtual gateway infrastructure near instantaneously.

It is still yet a further object, feature, and/or advantage of the present invention to negate the traditional approach of extensive, complex, bespoke and cumbersome gateway radio frequency hardware equipment stove-piping.

It is still yet a further object, feature, and/or advantage of the present invention to simplify gateway development.

It is still yet a further object, feature, and/or advantage of the present invention to improve functionality by providing an ability to augment third party value-add services.

It is still yet a further object, feature, and/or advantage of the present invention to offer more total configuration options in network design, a higher performance capacity, and a larger number of performance capability options than those satellite systems known in the art.

It is preferred the apparatus be safe, cost effective, and durable. For example, satellite systems disclosed herein have a lower cost gateway investment and operating costs than those known in the art. Ideally, these satellite communication systems maximize total satellite communications resource efficiency and return on investment and to reduces capital and operational expenditures, simplify and standardize the satellite architecture and hardware capable of delivering highly unique services, are provided within an ecosystem that enables a satellite communications cloud marketplace to drive innovation, lower cost, maximize performance and enhance services. According to a more specific non-limiting aspect, the satellite system can include a higher gateway resiliency.

Methods can be practiced which facilitate use, manufacture, assembly, maintenance, and repair of satellite systems which accomplish some or all of the previously stated objectives. For example, there can exist an ability to easily upgrade features and performance in a software environment, and to allow for changes significantly and frequently with little to no physical hands-on tasking that is ideally suited to operate flawlessly under pandemic and/or social distancing situations. In yet another example, a higher level of oversight and management with holistic view of total resource is provided.

The satellite systems and their components disclosed herein can be incorporated into other systems which accomplish some or all of the previously stated objectives.

According to some aspects of the present disclosure, a method of wirelessly communicating using cloud computing virtualized gateways, radio transport protocol, and space to ground optical communications comprises: communicatively coupling at least one cloud computing gateway ecosystem (CCGE) to a plurality of subscriber terminals; illuminating specific regions of the Earth's surface with user spot beams containing the subscriber terminals, wherein each user spot beam includes a downlink channel and an uplink channel; allowing two-way communication between the CCGE and the communications platform over a feeder link within the field of view of the communications platform, wherein the feeder link includes a forward link and a return link; creating data signals for the forward link based upon data received from external networks under parameters controlled by a network management system (NMS); outputting the forward link user data signals to a controller configured to package the data signals together and map the forward link user data signals to an associated user spot beam; creating digitized RF carrier waves in a particular RF based upon the associated user spot beam; digitally modulating and mapping bit streams that are transported within data packets (DP) and associated metadata packets (MP) to a ground optical communication feeder link system (GOCFLS) co-located or geographically distanced from the CCGE, and beamformed by an on-board digital beamforming processor; forwarding the return link to the CCGE; and monitoring and controlling a feeder link resiliency system that allows for switching of CCGEs and associated GOCFLSs to ensure operator specified availability of the feeder link system to the communications platform.

According to some additional aspects of the present disclosure, the subscriber terminal is selected from the group consisting of: a wireless modem, a cellular telephone, a wireless handset, a data transceiver, a paging or positioning determination receiver, or mobile radio-telephone, and a head end of a local network.

According to some additional aspects of the present disclosure, the communications platform includes a plurality of sub-systems selected from the group consisting of: a power source, solar panels, a propulsion system, a momentum control system, and an attitude control system.

According to some additional aspects of the present disclosure, the plurality of subsystems utilize core cloud computing resources that are provided at a cloud-computing data center (CDC) comprising one or more components selected form the group consisting of: a computer, a server, a database, a network, an analytics based software application, a control system, intelligence capabilities, and on-demand web-based services.

According to some additional aspects of the present disclosure, the network is selected from the group consisting of: the Internet, a wide area network (WAN), a public switch telephone network, a mobile telephone network, a private server, and an intranet network.

According to some additional aspects of the present disclosure, the method further comprises delivering the CCGE via a private cloud on-premises solution where the software is installed locally or on a public/private hybrid cloud combination.

According to some additional aspects of the present disclosure, the method further comprises selecting an Infra-structure-as-a-Service (IaaS), a Platform-as-a-Service (PaaS), and/or Software-as-a-Service offerings (SaaS) offering to operate the communications platform on based upon a nature and/or requirements of the communications platform.

According to some additional aspects of the present disclosure, the method further comprises sensing, monitoring, and/or controlling environmental aspects of the communications platform; and managing and/or coordinating at least a partial amount of resources of the communications platform based upon the sensed, monitored, and/or controlled environmental aspects.

According to some additional aspects of the present disclosure, the method further comprises storing software images, run-time data and other non-RAM functional data.

According to some other aspects of the present disclosure, a digitized ground based subsystem for use in transmitting an optical feeder uplink beam to a communications platform comprises an antenna array configured to receive the optical feeder uplink beam and to use an onboard processor and the multiple element antenna feed array to produce and transmit a plurality of RF service downlink beams to a service terminal; a cloud-computing data center (CDC); a virtualized air interface system configured to accept a plurality of data streams, multiplex the data streams, and produce a plurality of user data signals; a virtualized user data signal-spot beam controller (VUDSSBC) configured to accept the user data signals from the virtualized air interface systems and combine subsets of the user data signals into a plurality of user spot beam signals; a virtualized digital modulator and mapper configured to accept the user spot beam signals from the VUDSSBC and convert each to a digitized RF user spot beam signal; a virtualized packet based radio transport (VPBRT) configured to accept the digitized RF user spot beam signals from the VUDSSBC and packetizes in a plurality of information streams for multiplexing and transmission over a digital packet switched network; and a ground optical communications feeder link system (GOCFLS) configured to accept the digitized RF user spot beam signals in packetized form from the VPBRT and transmit the RF user spot beam signals to the communications platform.

According to some additional aspects of the present disclosure, the subsystem further comprises a cloud computing gateway management and interface system (CCG-MIS) configured to monitor the GOCFLSs performance and dynamically orchestrate the ground base subsystem, and the switching operations of the ground base subsystem between different CDCs and GOCFLSs supporting the communications platforms.

According to some additional aspects of the present disclosure, the subsystem further comprises a CCGMIS configured to orchestrate a scheduled and/or dynamic operation of a plurality of virtualized air interface systems between active, dormant and/or modified states.

According to some additional aspects of the present disclosure, the subsystem further comprises a CCGMIS configured with a plurality of communications platforms' inter-coordination agreement parameters to monitor and control the user spot beam RF frequency and power coordination across the plurality of the communications platforms.

According to some other aspects of the present disclosure, a system for a space based satellite comprises a ground optical communications feeder link system (GOCFLS) configured to accept digitized RF user spot beam signals in packetized form and to transmit the RF user spot beam signals to a communications platform; a cloud-computing data center (CDC); a satellite bus system; a space optical communication feeder link system (SOCFLS) configured to accept the digitized RF user spot beam signals in packetized form from the GOCFLS; an on-board digital network distribution system (OBDNDS) configured to accept the digitized RF user spot beam signals from the SOCFLS and perform packet based switched networking functions aboard the satellite; an on-board packet based radio transport (OBPBRT) configured to accept the digitized RF user spot beam signals in packetized form from the OBDNDS; an on-board digital beamforming processor (OBDBP) configured to accept the digitized RF user spot beam signals, and output a plurality of digitized RF transmit antenna element signals in dependance of the plurality of the digitized RF user spot beam signals and phase and amplitude beamforming coefficients; a plurality of on-board digital-to-analog converters (OBDAC) configured to accept the digitized RF transmit antenna element signals from the OBDBP, and converting to a plurality of analog RF transmit antenna element signals; a transmit RF distribution system (TRFDS) configured to accept the analog RF transmit antenna element signals from the OBDAC, and distribute through a plurality of analog RF chains; and a plurality of transmit antenna elements configured to accept a single analog RF transmit antenna element signal from the TRFDS to produce and transmit a plurality of RF service downlink beams to the service terminals.

According to some additional aspects of the present disclosure, the subsystem further comprises a cloud computing gateway management and interface system (CCG-MIS) configured to monitor the GOCFLS's performance and dynamically orchestrate the ground base subsystem, and the switching operations of the ground base subsystem between different CDCs and GOCFLSs supporting a satellite.

According to some additional aspects of the present disclosure, the CCGMIS is configured to orchestrate a scheduled and/or dynamic operation of a plurality of virtualized space link air interface system (VSLAIS) between active, dormant and/or modified states.

According to some additional aspects of the present disclosure, the CCGMIS is configured with a plurality of satellites' inter-coordination agreement parameters to monitor and control the user spot beam RF frequency and power coordination across the plurality of the satellites.

According to some additional aspects of the present disclosure, the subsystem further comprises an OBDAC configured to support operation across multiple RF spectrum bands; a TRFDS configured to support operation across multiple RF spectrum bands; a plurality of transmit antenna elements configured to support operation across multiple RF spectrum bands; and an antenna configured to support operation across multiple RF spectrum bands.

According to some additional aspects of the present disclosure, the subsystem further comprises a CCGMIS configured to orchestrate a scheduled and/or dynamic operation of a plurality of VSLAISs of various RF spectrum bands between active, dormant and/or modified states.

These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a) combinations of disclosed aspects and/or embodiments and/or (b) reasonable modifications not shown or described.

BRIEF DESCRIPTION OF THE DRAWINGS

Several embodiments in which the present invention can be practiced are illustrated and described in detail, wherein like reference characters represent like components throughout the several views. The drawings are presented for exemplary purposes and may not be to scale unless otherwise indicated.

An artisan of ordinary skill in the art need not view, within isolated figure(s), the near infinite number of distinct permutations of features described in the following detailed description to facilitate an understanding of the present invention.

DETAILED DESCRIPTION OF THE INVENTION

The present disclosure is not to be limited to that described herein. Mechanical, electrical, chemical, procedural, and/or other changes can be made without departing from the spirit and scope of the present invention. No features shown or described are essential to permit basic operation of the present invention unless otherwise indicated.

Ground Segment/High-Level

Figure 1:
FIG. 1 shows a diagrammatic view of a wireless communication system, according to some aspects of the present disclosure.

FIG. 1 depicts a high-level block diagram of a wireless communication system that includes a communications platform 100. The communications platform 100 can be a space based satellite located, for example, at a geostationary or non-geostationary orbital location. In other embodiments, other platforms may be used in addition to or in lieu of communications platform 100, such as: a manned aerial vehicle, an unmanned aerial vehicle (UAV), a free floating balloon, and/or a tethered balloon.

Platform 100 may be communicatively coupled to at least one cloud computing gateway ecosystem (CCGE) 101, and a plurality of subscriber terminals (ST) (including subscriber terminals 102, 108, and 109). As used herein, even if the plural term "subscriber terminals" is used, one of ordinary skill in the art will appreciate there will be some applications where the use of only one subscriber terminal will suffice. Moreover, although FIG. 1 only shows two (2) subscriber terminals 102, 108, and 109 within each region, a typical system may have thousands or more of subscriber terminals within each region. A subscriber terminal 102, 108, 109 can support a single or plurality of users.

According to a non-limiting example, the subscriber terminals 102, 108, and 109 can be adapted for communications with the wireless communication platform 100 and/or may be satellite(s).

The subscriber terminals 102, 108, 109 may include fixed and mobile terminals including, but not limited to, a wireless modem, a cellular telephone, a wireless handset, a data transceiver, a paging or positioning determination receiver, or mobile radio-telephone, or a head end of a local network. According to some non-limiting aspects of the present disclosure, the subscriber terminal can be handheld or larger customer premise equipment, portable (including vehicle mounted installations for aircraft, trucks, boats and maritime vessels, trains, etc.), and/or fixed as desired.

Where the communication platform of a wireless communication system is a space based satellite, the wireless communication system can refer to more specifically as the satellite communication system. For the remainder of this description, unless it is stated otherwise, it is assumed that the communication platform 100 is the satellite. Accordingly, platform 100 will be referred to as a satellite 100.

In some embodiments, satellite 100 comprises a spacecraft bus and one or more payloads (e.g., the communication payload). The satellite 100 includes multiple sub-systems, such as but not limited to, multiple power sources, batteries, solar panels, and one or more propulsion systems, momentum control systems, attitude control systems for operating the bus and the payload. In other embodiments, other bus systems components and configurations can be utilized.

At least one CCGE 101 may be coupled to a network or multiple networks 103 such as for example the Internet, public switch telephone network, mobile telephone network, or a private server or intranet network, etc.

The CCGE 101 and the satellite (or platform) communicate over a feeder link, which has both an uplink 104u and a downlink 104d. In some embodiments, the feeder link covers the Earth's surface (or another surface).

Although a single CCGE 101 is shown, some implementations will include multiple CCGEs 101.

Subscriber terminals (STs) 102, 108, and 109 and satellite 100 communicate over service beams, which are also known as user spot beams. For example, FIG. 1 shows user spot beams 105, 106 and 107, illuminating specific regions of the Earth's surface (or another surface). The communication system will include more than three user spot beams (e.g., sixty, one thousand, etc.), and the user spot beam size and coverage configuration can vary.

Each user spot beam 105, 106, and 107 has a single or plurality of downlink channel(s) 105d, 106d and 107d, and a single or plurality of uplink channel(s) 105u, 106u, 107u. The uplink and downlink channels carry user data signals.

In some embodiments, end-to-end communication within the system in FIG. 1, follows a nominal two-way direction whereby data is received by CCGE 101 from network 103 (e.g., the Internet) and sent to a set of subscriber terminals and vice versa. In one example, communication over the forward link comprises transmitting the data from the CCGE 101 to the satellite 100 via the uplink feeder link 104u and from the satellite 100 to one or more subscriber terminals via the downlink of one of the user spot beams (e.g., 105d).

Data can also be sent from the subscriber terminals 102, 108, and 109 over the return link to the CCGE 101. In one example, communication over the return path comprises transmitting data from the subscriber terminal (e.g., subscriber terminal 102 in service beam 105) to satellite 100 via uplink 105u of user spot beam 105, and from satellite 100 to CCGE 101 via downlink feeder link 104*d* whereby the data is sent by CCGE 101 to a connected network 103 (e.g., the Internet).

Although the above example uses spot beam 105 the example could have used any user spot beam, such as spot beams 106/107 or another spot beam not shown.

Ground Segment

Figure 2:
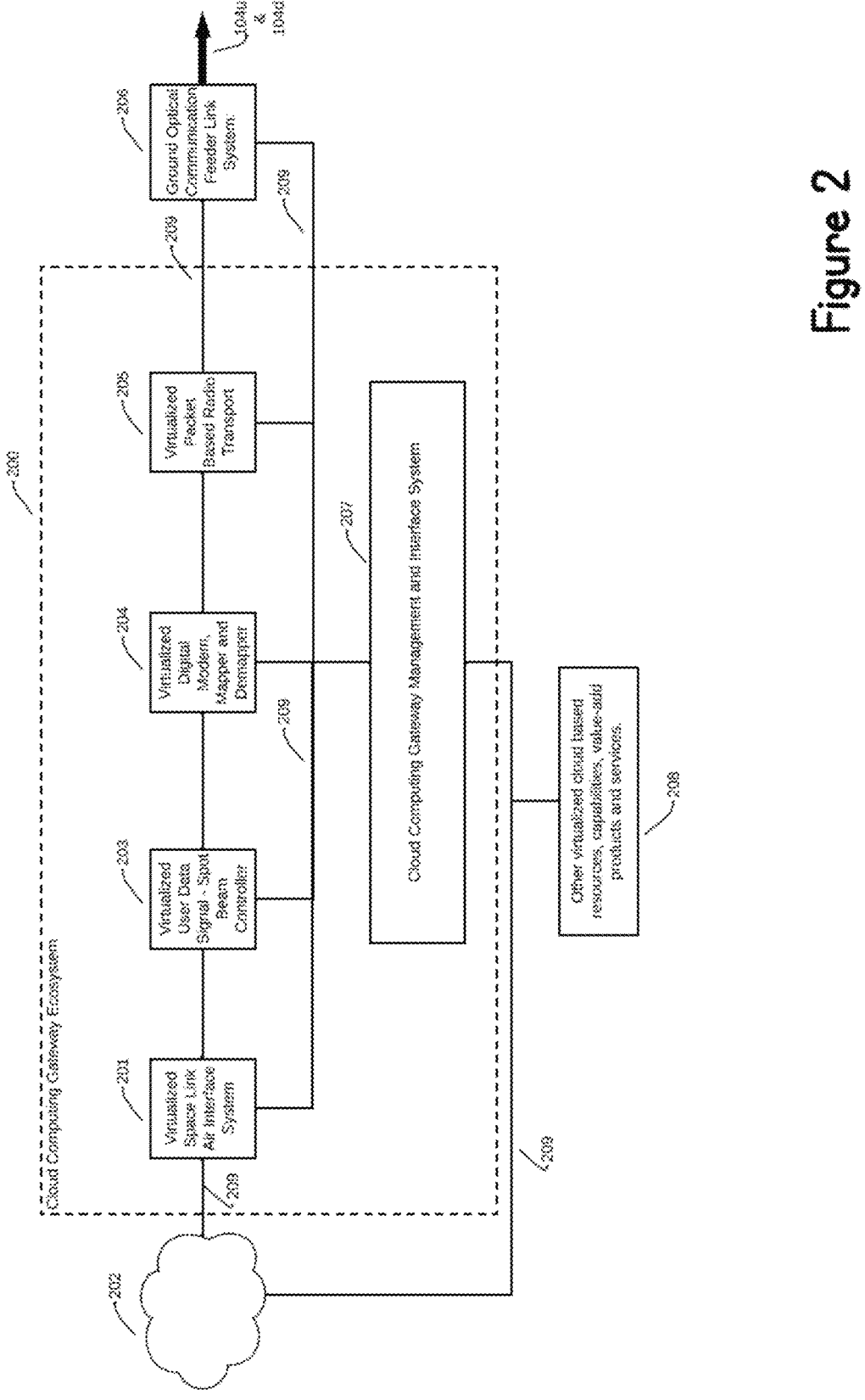
FIG. 2 shows a diagrammatic view depicting ground systems and equipment, according to some aspects of the present disclosure.

FIG. 2 depicts the block diagram of the ground component of the satellite communication system. The cloud computing gateway ecosystem (CCGE) 200 is a new architecture in the function of a single or plurality of gateways serving a single or plurality of satellites, thus multiple CCGEs are supported at multiple cloud data centers (CDCs).

The CCGE 200 and its sub-systems utilize core cloud computing resources that are provided at a CDC such as, but not limited to servers, compute, storage, databases, networking, software, configuration/management/control, analytics, and intelligence capabilities and services.

The means of delivering the CCGE 200 is independent of the underlying cloud computing resource architecture. It can be delivered via a private cloud on-premises solution where the software is installed locally on non-cloud based computers and servers. Additionally, it can be delivered via public off-premises solutions hosted by a third-party cloud service providers (CSP) (e.g., Amazon Web Services (AWS), Microsoft Azure, Google Cloud, etc.), or could be delivered by a combination of the two with a hybrid solution.

The CCGE 200 and its sub-systems can be collocated or geographically distributed due to the virtualized nature of its subsystems. In some embodiments, the collocated model will be utilized for simplicity both in design and operation.

The underlying resources and subsystems of the CCGE 200 can be delivered through the multiple embodiments with options available from cloud computing technologies and/or services offered by the cloud computing industry. Such technologies and services are varied and represents several means of carrying-out tasks and solving problems.

Cloud computing provides multiple attributes such as, but not limited to, efficiency, adaptability, accessibility, scalability, upgradability, flexibility, affordability, resiliency, reliability, and augmentable. Cloud computing additionally provides specific commercial operational attributes and technologies, such as but not limited to, on-demand and pay-as-you-use, and/or volume based pricing mechanisms.

In some embodiments utilizing a third party CSP, the CCGE 200 can be designed to run on an Infrastructure-as-a-Service (IaaS) offering due to the nature and bespoke requirements of the system. However, it is feasible that with the fast and ever-changing products/services offered by the cloud computing industry, that other embodiments could effectively run on a mixture of standard or enhanced Platform-as-a-Service (PaaS) offerings and/or Software-as-a-Service offerings (SaaS). The preferred third-party CSP embodiment can bring extensive and additional advantages and value-added services to the whole satellite communication system within a virtualized ecosystem through scale, accessibility, innovation, democratized advanced technologies, and cloud marketplaces.

The CCGE 200 provides a virtualized gateway environment which, in some embodiments, can include:
 I. the gateway transport sub-systems of the end-to-end satellite communication system that permits the efficient and effective transmission and reception of information to/from subscriber terminals;
 II. the enablement of new methods, features and services (virtualized or traditional) to manage, sense, monitor, control and/or coordinate the partial/total resources of the single satellite or plurality of satellites (or fleet of satellites); and/or
 III. an effective interface to other virtualized cloud-based resources, capabilities and value-add products and services (FIG. 2, 208).

The use of on-demand cloud computing platforms and application programming interfaces (APIs) (e.g., the Amazon Web Services (AWS) Global Infrastructure) can support the delivery and operation of the CCGE 200, for both a single and multi-vendor virtualized satellite communications ecosystem.

The CCGE 200 utilizes a cloud connected digital switched network (CCDSN) 209 that enables multiple resources, services, workloads, and virtual machine (VMs) to communicate with one another internally within the CCGE 200 and a connection to any external network or resource, such as but not limited to, Internet, public switch telephone network, mobile telephone network, other dispersed cloud resources, or a private server or intranet network, etc. For example, the use of AWS core networking services such as, but not limited to, Amazon Virtual Private Cloud (VPC) can allow separation of core virtualized resources, AWS Transit Gateway can enable streamlined and centralized routing of multiple VPCs, Amazon Route 53 can effectively connect user requests to infrastructure running in AWS-such as Amazon Elastic Compute Cloud (EC2) instances, elastic load balancers, or Amazon Simple Storage Services (S3) buckets and to route data to infrastructure and networks outside of AWS, and any on-premises networks, public and private subnets associated IP addresses, security groups and firewalls, etc.

In some embodiments, the CCGE 200 and CCDSN 209 utilize the Internet Protocol (IP) to facilitate the packet based digital networking requirements. As such the features of IP are available to support operations of the end-to-end satellite communication system.

Similar to cloud based systems, the CCDSN 209 is independent of the physical networking technologies and hardware that support IP functions.

In some embodiments, up to (and including) all components of the CCGE 200 and the satellite (FIG. 3, 300) can reside within the same IP subnet and thus negating any Layer 3 routing functionality. In other embodiments, Layer 3 routing, and other IP functionality are permitted.

Although the primary embodiment details the CCGE 200 connecting to the satellite (FIG. 3, 300), the CCGE 200 can scale and support a single or plurality of satellites where the sub-systems of the CCGE 200 are duplicated at the same CDC.

A virtualized space link air interface system (VSLAIS) 201 manages the network operations of a single or plurality of communication air interfaces (or access methods) suitable for air/space link operations and the conversion of user data information to/from baseband. The VSLAIS 201 couples to a single or plurality of networks 202 such as but not limited to, the Internet, terrestrial public switched telephone network, mobile telephone network or private server networks etc.

FIG. 2 shows a single VSLAIS 201, but more can be supported (e.g., five (5), forty (40), one hundred (100), etc.). Each VSLAIS 201 supports a single or plurality of transmit (forward link) and receive (return link) user data signals. The user data signal can be of a single or plurality of proprietary or open standard air interface types, such as but not limited to, digital video broadcasting satellite (DVB-S), such as DVB-Second Generation (DVB-S2X), Protected Tactical Waveform (PTW), time division multiplexing (TDM), frequency time division multiple access (F-TDMA), single channel per carrier (SCPC), carrier-in-carrier (CNC), orthogonal frequency-division multiplexing (OFDM), and code division multiple access (CDMA).

The VSLAIS 201 can support any version of a legacy, current or future satellite communications baseband air interface system.

In some embodiments utilizing a legacy and/or current satellite communication baseband air interface system, the virtualization process involves the porting or migration of some or all of the existing air interface functions currently delivered on standalone, on-premises and/or dedicated hardware resources, to the cloud computing resources.

In some embodiments integrating current and/or legacy satellite communication baseband air interface system into the CCGE 200 and cloud computing resource, the use of new application programming interface(s) to interface in a purely digitized RF domain is beneficial, as is the migration of other existing software images, programs and/or applications.

CSPs and cloud technology vendors offer migration capabilities to assist clients port their on-premises software, applications, and/or workloads to a virtualized cloud environment. The use of AWS migration services and tools, such as but not limited to, CloudEndure Migration, AWS Server Migration Service (SMS) and AWS Migration Hub, are employed to assess, mobilize, migrate, and modernize the satellite communication baseband air interface system to the cloud based VSLAIS 201 variant.

In other embodiments, new or future satellite communication baseband air interface systems can be developed into new versions of the VSLAIS 201 directly within a native cloud computing environment.

The VSLAIS 201 operates in a similar manner to a traditional satellite baseband air interface system with the same features and functionality to effectively enable and manage the transmission and reception of all types of data to/from subscriber terminals. Such functionality ensures telecommunications service delivery through use of attributes including, but not limited to, user data signals generation and reception, air interface network management and functionality, addressing, bandwidth allocation and type, routing, quality of service, authentication, security, management, monitoring, provisioning, event logging, OSS/BSS, troubleshooting, etc.

Similarly, with traditional hardware (non-cloud) based satellite communications baseband air interface systems, there are multiple methodologies that the VSLAIS 201 can employ to ensure user data signals are transmitted and received from subscriber terminals effectively. The CCGE 101 can support any of these methodologies for the specific satellite communications baseband air interface system in a VSLAIS 201 variant.

The VSLAIS 201 transmits and receives user data signals to and from a virtualized user data signal—spot beam controller (VUDSSBC) 203.

In some embodiments, the VSLAIS 201 transmits and receives user data signals, and passes any specified associated management, control and/or metadata, such as but not limited to, frequency, symbol rate, carrier spacing, roll-off factor, constant coding and modulation (CCM) or adaptive coding and modulation (ACM) details, to and from the VUDSSBC 203.

The VSLAIS 201 is performed through a single or plurality of VMs, instances, services and resources running on the cloud computing infrastructure. Multiple VSLAIS 201 variants are delivered via AWS products and services, such as but not limited to, Amazon Elastic Compute Cloud (EC2), Amazon Elastic Block Store (EBS), Amazon Simple Storage Services (S3), and Amazon Relational Database Services (RDS). AWS products and services allows organizations to migrate workloads such as applications, websites, databases, storage, physical or virtual servers, or entire data centers to the cloud. A traditional satellite communication baseband air interface system incorporates servers to carry out the air interface networking and network management system (NMS) functions, these applications can run on the versatile EC2 instances of varying types of compute capabilities including processor, core numbers and type, storage, network bandwidth and associated type and quantity of memory. The VSLAIS 201 functionally stores multiple information technology components such as, but not limited to, software images, run-time data and other non-RAM functional data. EBS can provide multiple service options for both hard disc drive (HDD) and solid state drive (SSD) variants. Additionally, RDS services can support, operate, and scale a relational database in the cloud for the satellite communication baseband air interface system network statistics for storage, retrieval, analysis, and reporting. Additionally, S3 object storage services can be utilized to store software images, backups, archives, and big data analytics.

In other embodiments, other cloud service combinations and/or additional services of AWS or other CSPs and cloud vendors, can be employed to create and operate the VSLAIS 201.

The VUDSSBC 203 manages the association of the user data signals to/from a single or plurality of VSLAISs to specific user spot beams (e.g., spot beams 105, 106, and 107). The user spot beams can be configured for a static fixed laydown configuration, in a dynamically changing real-time environment or a hybrid of both.

The VUDSSBC 203 receives the transmit user data signals, and any associated metadata from a single or plurality of VSLAIS 201. The VUDSSBC 203 groups specific transmit user data signals and associated metadata to a specific transmit forward user spot beam and sends these to the virtualized digital modem, mapper and demapper (VDMMD) 204.

The VUDSSBC 203 accepts the receive user data signals from the VDMMD 204 grouped within specific receive return user spot beams and distributes them to the relevant associated VSLAIS 201. In some embodiments, the VUDSSBC 203 passes any metadata associated with the receive user data signals from the VSLAIS 201 to the VDMMD 204.

A cloud computing gateway management and interface system (CCGMIS) 207 can manage, control, and/or oversee the user spot beam laydown operations. The CCGMIS 207 orchestrates and coordinates the subsystems of the CCGE 200 under an encompassing and holistic view of the entire end-to-end communications system, that primarily incorporates the CCGE 200 and satellite 100. The CCGMIS 207 orchestrates the user spot beam operations and their associated user data signals utilizing knowledge on factors such as, but not limited to, available RF spectrum resource, frequency re-use rules, preconfigured variables, autonomous control variables, rule based algorithms, priorities, bandwidth demand, resource analysis, performance analysis, satellite power, artificial intelligence machine learning (AI/ML) insights, business factors, and/or other external factors and variables.

In other embodiments, due to the flexibility of cloud computing resources, some/all of the core functions of the CCGMIS 207 are permitted to be carried out by other sub-systems of the CCGE 200 and/or other external systems.

The VUDSSBC 203 manages a plurality of user spot beams and each may have whatever total bandwidth in radio frequency (RF) is best suited for the application, contiguous or non-contiguous for both the transmit forward user spot beams and receive return user spot beams.

In other embodiments, the VUDSSBC 203 can additionally support broadcast and multicast transmit user data signals and map them to multiple or all transmit forward user spot beams.

In some embodiments, the transmit forward user spot beams to the subscriber terminals have five hundred megahertz (500 MHz) contiguous available RF spectrum, and the receive return user spot beams from the subscriber terminals have two hundred fifty megahertz (250 MHz) contiguous available RF spectrum.

The VUDSSBC 203 transmits and receives the user spot beam configurations with the associated user data signals, to/from the VDMMD 204.

The VUDSSBC 203 passes the transmit forward user spot beam configurations containing the associated forward user data signals and associated metadata (such as but not limited to frequency, symbol rate, carrier spacing, roll-off factor, CCM and/or ACM) to the VDMMD 204.

The VUDSSBC 203 accepts the receive return user spot beams configurations containing the associated return user data signals from the VDMMD 204, disaggregates and passes the specific return user data signals to the appropriate VSLAIS 201. The VUDSSBC 203 passes any metadata relating to the specific return user data signals and receive return user spot beams (such as but not limited to frequency, symbol rate, carrier spacing, roll-off factor, CCM and/or ACM) from the VSLAIS 201 to the VDMMD 204, to allow effective demodulation of return user data signals.

In other embodiments, metadata initiating from a VSLAIS 201 to the VDMMD 204 can be passed directly or other means without the need of the VUDSSBC 203, as long as this task, when needed, is carried out.

Figure 3:
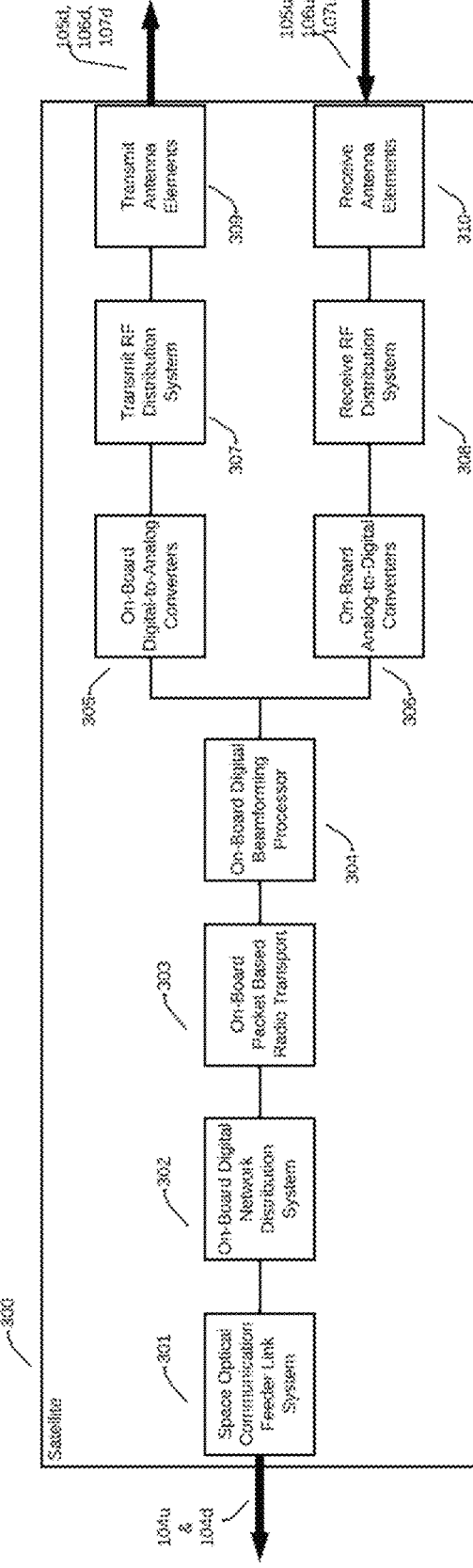
FIG. 3 shows a diagrammatic view depicting the space segment systems and equipment, according to some aspects of the present disclosure.

The VUDSSBC 203 is performed through a single or plurality of VMs, instances, services and resources running on the cloud computing infrastructure. The VUDSSBC 203 can be delivered via AWS products and services, such as but not limited to, EC2, EBS, S3, and RDS. The VUDSSBC 203 incorporates servers to carry out the user spot beam management and control functions, these applications can run on versatile EC2 instances of varying types of compute capabilities including processor, core numbers and type, storage, network bandwidth and associated type and quantity of memory. In other embodiments the spot beam control can be carried out onboard the satellite (FIG. 3, 300).

In some embodiments, the VUDSSBC 203 functionally stores multiple information technology components such as, but not limited to, software images, run-time data and other non-RAM functional data. EBS can provide multiple service options for both HDD and SSD variants. Additionally, RDS services can support, operate, and scale a relational database in the cloud for the spot beam system statistics for storage, retrieval, analysis, and reporting. Additionally, S3 object storage services can be utilized to store software images, backups, archives, and big data analytics.

In other embodiments, other cloud service combinations and/or additional services of AWS or other CSPs and cloud vendors, can be employed to create and operate the VUDSSBC 203.

The VDMMD 204 allows user data signals grouped within the user spot beams to be created, manipulated, and extracted digitally to/from the digital (non-analog) RF domain. The VDMMD 204 can be operator configured with multiple parameters, such as but not limited to, signal sampling and rates, I/Q data, amplification, and conditioning. In some embodiments, the VDMMD 204 can utilize the Vita 49 standard for digital RF data signals.

The VDMMD 204 creates digitized RF carrier waves (of various frequencies, bandwidths and amplitudes) and modulates/maps them with the baseband forward link user data signals within each forward link user spot beam.

The VDMMD 204 extracts the baseband return link user data signals within each return link user spot beam by demodulating/demapping digitized RF signals.

In other embodiments, the VDMMD 204 can employ additional digital signal processing and signal manipulation techniques, such as but not limited to, amplification, conditioning, interference removal, jamming detection and mitigation etc., to improve and optimize performance of the digitized RF signals and the performance of the end-to-end satellite communications network.

In some embodiments, the VDMMD 204 utilizes metadata provided by the VSLAIS 201 and the VUDSSBC 203 to carry out the functions of converting the user data signals.

In some embodiments, the VDMMD 204 utilizes the MATLAB computing environment running on the cloud infrastructure to carry out the digital signal processing (DSP) tasks of converting to/from digitized RF based.

The VDMMD 204 is performed through a single or plurality of VMs, instances, services and resources running on the cloud computing infrastructure.

In some embodiments, the VDMMD 204 is delivered via AWS products and services, such as but not limited to, EC2, EBS, S3, and RDS. The VDMMD 204 incorporates servers to carry out the RF signal digitization creation functions, these applications can run on versatile EC2 instances of varying types of compute capabilities including processor, core numbers and type, storage, network bandwidth and associated type and quantity of memory. The choice of EC2 types for the VDMMD 204 can range from basic general purpose processing (GPP) to high performance computing (HPC) such as, but not limited to, to CPUs in a clustered environments or FPGA instances to enable delivery of custom hardware acceleration (e.g., AWS EC2 F1 services), and is dynamically selectable by the operator of the system depending on workload and performance desired.

In some embodiments, VDMMD 204 functionally stores multiple information technology components such as, but not limited to, software images, run-time data, other non-RAM functional data and data lakes. EBS provides multiple service options for both HDD and SSD variants. Additionally, S3 object storage services can be utilized to store software images, backups, archives, and big data analytics. S3 can also be utilized to store digitized RF data lakes for real-time and post-operative analysis.

In other embodiments, other cloud service combinations and/or additional services of AWS or other CSPs and cloud vendors, can be employed to create and operate the VDMMD 204.

The VDMMD 204 sends the forward link user spot beam digitized RF signals and receives the return link user spot beam digitized RF signals respectively to/from a virtualized packet based radio transport (VPBRT) 205.

Other embodiments permit the digitized RF modulation, demodulation, mapping and demapping functions to be carried out in a different order. In some embodiments the VDMMD 204 functions can be carried out between the VSLAIS 201 and the VUDSSBC 203. In one such embodiment the VUDSSBC 203 receives and sends digitized RF signals from/to the VSLAIS 201, thus the single or plurality of VSLAISs are responsible for their own individual digitized RF signal creations and interpretations, and the VUDSSBC 203 groups digitized RF user data signals to/from the appropriate spot beams. Irrespective of where the VDMMD 204 resides, the transport of digitized RF signals between sub-systems within the CCGE 200 may be delivered by core cloud computing networking services and/or other technologies that can ensure digitized radio signal transport integrity and fidelity, such as but not limited to, Vita 49 radio transport protocol.

The CCGE 200 interfaces with a single or plurality of satellites, in the digital domain utilizing digitized RF signals for the primary function of the end-to-end satellite communications system. The digitized RF signals are sent to/from different sub-systems and their associated VMs, instances and/or other cloud resources within the CCGE 200, and between the CCGE 200 and the satellite (FIG. 3, 300).

The VPBRT 205 ensures the effective transmission and reception of digitized RF signals across a digital packet switched network and additionally ensures digitized RF signal integrity, including but not limited to signal fidelity, timing, and synchronization.

On the forward link direction, the VPBRT 205 packetizes forward link user spot beam digitized RF signals in data packets (DP) for transmission over a digital switched network. Additionally, the VPBRT 205 augments the significance of these digitized RF signal streams by coupling them to critical information about the RF signals with metadata encapsulated in metadata packets (MP). The MP contain context information and operating parameters for each data packet stream.

Radio transport DP and MP form the radio transport information streams (IS) that are transported to an end point for signal reconstruction and/or processing, either in a virtualized and/or analog physical form.

On the return link direction, the VPBRT 205 depacketizes return link user spot beam digitized RF signals within IS that include their respective DP and MP received over a digital switched network.

The VPBRT 205 utilizes the MP containing context information and operating parameters for DP stream to reconstruct the digitized RF signals with predetermined and configured level of fidelity. In a non-limiting example, the use of the Vita 49 standard from the Vita Standards Organization (VSO) for the packet based radio transport protocol (RTP) can be employed.

In other embodiments, other packet based radio transport standards or proprietary packet based radio transport can be utilized with additional features and/or services, such as but not limited to, increased control, status, operation, and configuration information. The VPBRT 205 is a protocol for end to end radio transport. The VPBRT 205 should include source and destination points in order to run interoperable versions of the protocol. The prime function of the RTP is to transport digitized RF signals between the satellite 300 and the CCGE 200. In some embodiments, the VPBRT 205 can be utilized to transport digitized radio signals between different subsystems within the CCGE 200 to ensure digitized radio signal transport integrity and fidelity.

The sub-systems of the CCGE 200 can be collocated for simplicity, however other embodiments permit the geographic dispersity of sub-systems if so desired.

In some embodiments, the transport of digitized RF signals between sub-systems within the CCGE 200 may be delivered by core cloud computing networking services and/or other technologies that can ensure digitized radio signal transport integrity and fidelity.

Other embodiments permit both the VDMMD 204 and VPBRT 205 to co-exist together on the same cloud computing compute instance(s) and associated resources.

The VPBRT 205 is performed through a single or plurality of VMs, instances, services and resources running on the cloud computing infrastructure. In some embodiments, the VPBRT 205 is delivered via AWS products and services, such as but not limited to, EC2, EBS, and S3. The VPBRT 205 incorporates servers to carry out the RTP functions, these applications can run on versatile EC2 instances of varying types of compute capabilities including processor, core numbers and type, storage, network bandwidth and associated type and quantity of memory.

In some embodiments, VPBRT 205 functionally stores multiple information technology components such as, but not limited to, software images, run-time data, and other non-RAM functional data. Additionally, S3 object storage services can be utilized to store software images, backups, archives, and big data analytics.

In some embodiments, the VPBRT 205 utilizes AWS core networking services such as, but not limited to, AWS Transit Gateway and Amazon Route 53.

In other embodiments, other cloud service combinations and/or additional services of AWS or other CSPs and cloud vendors, can be employed to create and operate the VDMMD 204.

The VPBRT 205 sends the forward link user spot beam digitized RF signals to and receives the return link user spot beam digitized RF signals from, a ground optical communications feeder link system (GOCFLS) 206.

The CCGE 200 connects to a single or plurality of satellites (FIG. 3, 300) via a single or plurality of GOCFLS 206.

In the preferred embodiment, the GOCFLS 206 provides the digital communications link to/from the satellite (FIG. 3, 300) and thus extends the digital switched network to the satellite 300. A free space optical communication system is chosen for the feeder link between the CCGE 200 and the satellite (FIG. 3, 300) due to its high data throughput capability associated for the transport of multiple VPBRT 205 IS sessions.

An optical communication system is chosen over any RF system, even at Q/V band, as RF does not possess equivalent capacity to support high throughput satellites (HTS), very high throughput satellites (VHTS) and very very high throughput satellites (VVHTS), which is known as ultra high throughput satellites (UHTS).

The GOCFLS 206 carries out the transmission and reception of data signals between the CCGE 200 and the satellite (FIG. 3, 300).

In the preferred embodiment, the primary task of the GOCFLS 206 is to transport IS to/from the CCGE 200 and the spacecraft (FIG. 3, 300).

In other embodiments, the GOCFLS 206 can also be used to transport other data to/from the satellite 300, such as but not limited to Telemetry, Tracking and Command (TT&C), Command & Data Handling (CD&H) information, and firmware and other software upgrades to the satellite 300.

In some embodiments, the GOCFLS 206 utilizes a Tbps capacity bi-directional ground-space/space-ground optical communications system. Other embodiments can utilize other variants of lower throughput capacity such as one hundred Gigabits per second (100 Gbps).

In some embodiments, the GOCFLS 206 Tbps capacity is delivered through a single optical ground station using dense wavelength division multiplexing (DWDM) techniques as known from terrestrial fiber communications, and/or other free space optics technologies.

The CCGE 200 and GOCFLS 206 link to the satellite 300 will intermittently experience blockage by weather clouds, other atmospheric effects and/or other local operational issues, such as but not limited to, power outages and CDC catastrophic failures etc., and thus will be compensated by CCGE 200 and GOCFLS 206 diversity. The bi-directional ground-space/space-ground optical communications system is primarily affected by factors, such as but not limited to, the field of view between the GOCFLS 206 and the satellite 300, scintillation and beam wander induced by the atmospheric index-of-refraction turbulence. The GOCFLS 206 utilizes capabilities, such as but not limited to, mitigating of these distortions by an according high-speed tracking and fading compensation techniques.

In some embodiments, the GOCFLS 206 utilizes adaptive optics (AO) to mitigate many of the atmospheric turbulence effects. In other embodiments, the GOCFLS 206 can utilize other physical and frame layer technologies to ensure the specified 100's Gbps, Tbps and above free space bi-directional throughput.

The ground-space/space-ground optical communications system can be susceptible to localized atmospheric effects, such as but not limited to, rain-fade, turbulence and/or other scintillation effects. As such, the ability to switch back and forth between different geographically dispersed CCGEs and associated GOCFLSs is permitted.

When the specific localized atmospheric effects restrict operation of a specific CCGE and its GOCFLS, the system is switched to another CCGE and its GOCFLS under more favorable conditions conducive to effective operations.

The GOCFLS 206 can be either collocated with the CCGE 200, or at another location connected via a digital switched network, such as but not limited to, fiber optical links.

In some embodiments, a plurality of GOCFLSs and CCGEs are utilized for resiliency and higher specified total satellite communication system availability. However, the satellite communication system is optimized to utilize as few geographically dispersed CCGEs and their associated GOCFLSs as possible whilst maintaining a specified availability percentage.

In the first embodiment, a specific satellite 300 is typically serviced by only one CCGE 200 and associated GOCFLS 206 for normal service operation at any instant. In other embodiments multiple CCGEs and associated GOCFLSs are permitted to service the satellite 300 concurrently. However, in some embodiments, the use of a feeder link make-before-break system is employed to allow seamless switchover between a plurality of geographically dispersed CCGEs and their associated GOCFLSs, to maximize the satellite communication system availability. In some embodiments, the satellite 300 is equipped with multiple space optical communication feeder link systems (SOCFLS) (FIG. 3, 301), allowing each to connect to a different set of CCGE and GOCFLS configurations.

In other embodiments where the satellite 300 has a single SOCFLS 301, diversity is provided through an active and hot standby operation of geographically dispersed CCGEs and their associated GOCFLSs, where one CCGE/GOCFLS is active and another CCGE/GOCFLS is in hot standby mode ready to switch in when it becomes beneficial.

The CCGE 200 and the GOCFLSs communicate using a CCDSN 209. In the embodiments where the GOCFLS 206 is not collocated with the CCGE 200, the CCDSN 209 can extent from within the cloud computing infrastructure over external public or private networks to where the GOCFLS 206 are located geographically.

A single CCGE at a CDC may be supported by a single or plurality of GOCFLSs 206 that are collocated and/or geographically dispersed. In some embodiments, where the CCGE 200 is supported by geographically dispersed GOCFLSs 206, a wide area network (WAN) can be used for the connection and to extend the packet switched networking from the CCGE 200 to each of the GOCFLSs 206.

In embodiments where a plurality of geographically dispersed CCGEs 200 and their CDCs each with its own GOCFLS and/or pool of GOCFLSs co-located or otherwise, are employed, the system is optimized when the online CCGE and its associated VMs, cloud computing instances and other cloud resources are activated as/when the specific CCGE is beneficial for operation. Further embodiments allow multiple CCGEs to be active during a make-before-break operation with only one GOCFLS active at any instant.

Although the primary embodiment details the CCGE 200 connecting to the satellite (FIG. 3, 300) via the GOCFLS 206, a CCGE can scale and support a plurality of satellites where the sub-systems of the CCGE 200 are duplicated at a particular CDC, and where the particular CDC is connected and supported by multiple GOCFLSs, one for each satellite operated and supported.

In some embodiments, the end-to-end satellite communications system and all sub-systems are orchestrated and monitored by the means of the CCGMIS 207. The CCGMIS 207 interfaces with all or a subset of the end-to-end satellite communication sub-systems, including both the ground and space segment. In other embodiments, other orchestration systems can be employed utilizing a mixture of private and/or public cloud and/or other on-premises based management systems.

In further embodiments, sub-systems of the CCGE 200 can utilize their own network management systems (NMS) and/or their own control systems (CS) either within a single or plurality of VMs, instance(s) and other cloud resources, or within a traditional on-premises server application environment that connects to the CCGE 200. The NMSs and/or CSs communicate management, configuration, and operations information to/from the sub-systems of the CCGE 200, under the high-level orchestration of the CCGMIS 207. A single or plurality CCGMISs 207 can be utilized in a master and slave(s) configuration.

In some embodiments, the CCGMIS 207 is collocated at the same CDC as the CCGE 200. In other embodiments the CCGMIS 207 can be operating from different CDCs with or without an active CCGE to satellite link.

In some embodiments, the CCGMIS 207 manages and controls the switching from one CCGE 200 to another to provide resiliency in the end-to-end satellite communications system.

The CCGMIS 207 is performed through a single or plurality of VMs, instances, services and resources running on the cloud computing infrastructure. In some embodiments, CCGMIS 207 is delivered via AWS products and services, such as but not limited to, EC2, EBS, S3, and RDS. The CCGMIS 207 functionally stores multiple information technology components such as, but not limited to, software images, run-time data and other non-RAM functional data. EBS can provide multiple service options for both HDD and SSD variants. Additionally, RDS services can support, operate, and scale a relational database in the cloud for the CCGMIS 207 statistics for storage, retrieval, analysis, and reporting. Additionally, S3 object storage services can be utilized to store software images, backups, archives, and big data analytics.

In other embodiments, other cloud service combinations and/or additional services of AWS or other CSPs and cloud vendors, can be employed to create and operate the CCG-MIS 207.

Space Segment

FIG. 3 depicts the block diagram of the space segment component of the satellite communication system.

The satellite 300 will include multiple additional bus components (not shown in the diagram), including but not limited to, power sources, such as batteries, solar panels and one or more propulsion systems, for the general operation of the bus and the payload.

The satellite 300 communicates with the GOCFLS (FIG. 2, 206) via a single or plurality of SOCFLS 301.

In some embodiments, the SOCFLS 301 is designed to be compatible with the GOCFLS (FIG. 2, 206) and to place a higher burden of maintaining the bi-directional high throughput (Gbps-Tbps and higher) link on the GOCFLS 206, resulting in a reduced the size, weight, power and cost (SWaPC) of the SOCFLS 301.

The primary task of the SOCFLS 301 is to transport the forward and return link user spot beam digitized RF signals within their respective IS between the satellite 300 and the CCGE (FIG. 2, 200), specifically between the on-board packet based radio transport (OBPBRT) 303 and the VPBRT (FIG. 2, 205).

In other embodiments, the SOCFLS 301 can be used to transport any other data, such as but not limited to, telemetry, tracking and command (TT&C) data.

The SOCFLS 301 sends the multiple forward link IS and receives multiple return link IS to/from the OBPBRT 303, via an on-board digital network distribution system (OBDNDS) 302.

The OBDNDS 302, performs all packet based digital networking activities between on-board sub-systems and components of the satellite 300.

In some embodiments, the OBDNDS 302 is achieved with fiber optic connections and a plurality of fiber optic transceivers utilized at respective end points. Other embodiments can utilize other packet based digital network and/or high-speed serial connection technologies.

The OBPBRT 303 ensures the effective transmission and reception of forward and return digitized RF signals within IS sent to and from the SOCFLS 301. The OBPBRT 303 carries out a similar function as the VPBRT (FIG. 2, 205), on board the satellite.

In the forward link direction, the OBPBRT 303 depacketizes digitized RF signals within data packets (DPs) and metadata packets (MP) received from the OBDNDS 302.

The OBPBRT 303 utilizes the MP containing context information and operating parameters for each DP stream to reconstruct the digitized RF signals with operator defined predetermined level of fidelity.

In the return link direction, the OBPBRT 303 packetizes digitized RF signals in data packets (DP) for transmission over a digital switched network. Additionally, the OBPBRT 303 augments the significance of these digitized RF signal streams by coupling them to critical information about the RF signals with metadata encapsulated in metadata packets (MP). The MP contain context information and operating parameters for each DP stream.

Radio transport DP and MP form the radio transport IS that are transported to an end point for signal reconstruction and processing, either in a virtualized or physical form.

In some embodiments, the Vita 49 standard from the Vita Standards Organization (VSO) for the radio transport packet based protocol is utilized.

In other embodiments, other packet based radio transport standards or proprietary variants can be utilized with additional features and/or services, such as but not limited to, increased control, status and configuration information.

As the OBPBRT 303 utilizes a protocol for end to end radio transport, the OBPBRT 303 requires source and destination points to be running interoperable versions of the protocol.

The OBPBRT 303 sends the forward link user spot beam digitized RF signals and receives return link user spot beam digitized RF signals to/from a single or plurality of on-board digital beamforming processors (OBDBP) 304.

The OBDBP 304 provides the ability to create the plurality of various sized, flexible, adaptive forward and return link user spot beams on the Earth, known as a laydown, that encompass and carry the uniquely assigned forward and return link user data signals. Flexibility in the satellite communication system allows the user spot beam laydown to be fixed or to change dynamically, even down to a sub-second by sub-second basis.

The OBDBP 304 obtains, calculates, or otherwise produces phase and amplitude coefficients for each forward and return link user spot beam signal for all (or a subset of) spacecraft antenna elements (FIGS. 3, 309 and 310), and thus carries out the beamforming functions for the forward and return links. The OBDBP 304 creates unique forward link digitized RF transmit antenna element signals and receives unique return link digitized RF receive antenna element signals for processing. The OBDBP 304 performs the beamforming analysis and computation in the digital domain with digitized RF signals.

In other embodiments, the OBDBP 304 can utilize alternate beamforming technologies and methods such as, but not limited to, the use of calibration subsystems that utilize reference remote terminals, and/or a multiple of algorithms and computations.

In other embodiments, the OBDBP 304 can obtain beamforming instructions including but not limited to spot beam locations, dimensions, phase and amplitude coefficients, refence remote(s) calibration data, and other management information from other sources such as the CCGE 200 and/or other ground based resources.

In some embodiments, the OBDBP 304 employs digital beamforming creating different signals designed for each of the spacecraft antenna elements in the digital domain allowing for greater flexibility since one can assign different powers and phases to different antenna elements and to different parts of the frequency bands. This makes digital beamforming particularly desirable for user spot beam laydown and beneficial when having a wide bandwidth because with fixed phases and/or amplitude the signal will get a different directivity in different parts of the band.

In some embodiments, the OBDBP 304 creates a single forward link digitized RF signal per transmit antenna element and receives a single return link digitized RF signal per receive antenna element. In other embodiments, the OBDBP 304 may utilize a subset of the transmit antenna elements and/or receive antenna elements.

In some embodiments, the satellite antenna system (FIGS. 3, 309 and 310) utilizes 250 transmit antenna elements (TAE) (FIG. 3, 309) for each of two transmit polarizations V/H or L/R, hence 500 total TAEs; and 250 receive antenna elements (RAE) (FIG. 3, 310) for each of two receive polarizations V/H or L/R, hence 500 total RAEs. Other embodiments can utilize whatever number of TAEs and RAEs is configured and/or specified in the satellite antenna system by the satellite manufacturer, owner, operator, and/or other. The higher the number of antenna elements in the system, the higher the number digitized RF signals.

The hardware implementation of the OBPBRT 303 and OBDBP 304 can be provided by means of multiple configuration embodiments. This can include, but not limited to, the combinations of CPU, memory, ASIC, FPGA, clocking generators, and various Interfaces to optimize the size, weight and power, and cost (SWaPC) trade-offs for the satellite and its performance.

In other embodiments, the OBDBP 304 can be utilized to carry out spacecraft bus housekeeping operations, such as but not limited to, tracking, telemetry & control (TT&C) and command & data handling (CD&H).

The OBDBP 304 sends forward link digitized RF transmit antenna element signals to a plurality of on-board digital-to-analog converters (OBDAC) 305 and receives return link digitized RF receive antenna element signals from a plurality of on-board analog-to-digital converters (OBADC) 306.

The OBDAC 305 performs the conversion of each of the forward link digitized RF transmit antenna element signals into a respective analog RF signal mapped to a specific TAE 309.

In some embodiments, the OBDAC 305 utilizes RF softwarization and converts the digitized RF signals to analog RF in the desired analog RF, such as but not limited to, S, L, Ku, Ka and/or C band, via direct microwave digitization. The OBDAC 305 can, in a non-limiting example, utilize system in package (SiP) technology to deliver the software defined microwave (SDM) systems allowing the direct conversion from digital to analog RF, therefore placing the digital conversion closer to the TAEs 309, and simplifying and reducing complex analog RF componentry and circuitry, such as but not limited to, filters, orthomode junctions, test couplers, upconverts, intermediate amplifiers etc.

Further, the OBDAC 305 can employ direct synchronization technologies across the array of SiP DACs.

In other embodiments, the OBDAC 305 can utilize other multiple DAC RF technologies to carry out the conversion of multiple digitized RF signals to analog variants.

The output of the OBDAC 305 is forwarded to a transmit RF distribution system (TRFDS) 307.

TRFDS 307 ensures that every analog RF signal is applied to the associated physical TAE 309 on the antenna system.

The TRFDS 307 ensures the analog RF signals are amplified through the use of monolithic microwave integrated circuit (MMIC) hardware that provide functions, such as but not limited to, microwave mixing, power amplification, wideband power amplification, and/or high-frequency switching.

In other embodiments, the use of other RF conditioning and amplification systems is permitted in the TRFDS 307 to ensure that the analog RF signals are kept to the operator desired level of operation between the OBDAC 305 and the TAE 309, and ultimately between the OBDAC 305 and the subscriber terminals (STs). In other embodiments, the level of complexity and performance of the TRFDS 307 varies with the number and type of associated components depending on operator specifications.

The TAEs 309 and the rest of the transmit antenna can be collectively referred to as the transmit antenna subsystem. The use of a feed array and reflector system can be employed. All or some of the TAEs 309 can share a common reflector. Such reflectors is/are not shown in the diagrams for simplicity. The TAEs 309 form a multiple element transmit antenna feed array. This multiple element transmit antenna feed array is used to form the downlink spot beams as created by the OBDBP 304.

In other embodiments, the use of other transmit element array antenna technology such as, but not limited to, direct radiating antenna (DRA) technologies are permitted.

The TAEs 309 each transmit their unique analog RF signal that contains and forms all or a subset of the downlink user spot beams with associated RF forward user data signals in the beamforming environment.

A plurality of RAEs 310 and the rest of receive antenna can be collectively referred to as the receive antenna subsystem. The use of a feed array and reflector system can be employed. All or some of the RAEs 310 can share a common reflector. Such reflectors is/are not shown in the diagrams for simplicity. The RAEs 310 form a multiple element receive antenna feed array. This multiple element receive antenna feed array is utilized by the OBDBP 304 to form the uplink spot beams.

In other embodiments, the use of other receive element array antenna technology such as, but not limited to, direct receiving antenna (DRA) technologies are permitted.

The RAEs 310 each receive their unique analog RF signal that contains all or a subset of the uplink user spot beams with associated RF return user data signals in the beamforming environment.

The RAEs 310 forward their unique analog RF signals to respective OBADC 306 via a receive RF distribution system (RRFDS) 308.

The RRFDS 308 ensures that every analog RF signal from each of the physical RAE 310 on the receive antenna system is forwarded to a respective OBADC 306.

The RRFDS 308 ensures the receive analog RF signals are bandpass filtered and amplified prior to being received by the OBADC 306 through the use of monolithic microwave integrated circuit (MMIC) hardware that provide functions, such as but not limited to, microwave mixing, low noise amplification, wideband low noise power amplification, low phase noise amplification, tunable bandpass filtering and/or high-frequency switching.

In other embodiments, the use of other RF conditioning and amplification systems are permitted in the RRFDS 308 to ensure that the analog RF signals are kept to the operator desired level of operation between the RAEs 310 and the OBADC 306, and ultimately between the subscriber terminals (ST) and OBADC 306. In other embodiments, the level of complexity and performance of the RRFDS 308 varies with the number and type of associated components depending on operator specifications.

The OBADC 306 performs the conversion of each of the analog RF signals into a respective return link digitized RF transmit antenna element signal mapped from a specific RAE 310. The OBADC 306 sends the return link digitized RF receive antenna element signals to the OBDBP 304.

In some embodiments, the OBADC 306 utilizes ultra-wideband (UWB) RF softwarization and converts the analog RF signal in the desired analog RF, such as but not limited to, S, L, Ku, Ka and/or C band, to a digitized RF signal via direct microwave digitization. The OBADC 306 can utilize system in package (SiP) technology to deliver the software defined microwave (SDM) systems allowing the direct sampling from analog to digital RF, therefore placing the digital conversion closer to the RAEs 310, and simplifying and reducing complex analog RF componentry and circuitry, such as but not limited to, filters, orthomode junctions, test couplers, downconverters, filters, and/or intermediate amplifiers etc.

Further, the OBADC 306 can additionally employ direct synchronization technologies across the array of SiP ADCs.

In other embodiments, the OBADC 306 can utilize other multiple ADC RF technologies to carry out the conversion of multiple analog RF signals to digitized variants.

The OBADC 306 forwards the digitized RF signals from all or a subset of the RAEs 310 to the OBDBP 304
Operation
Forward Link FIG. 2 and FIG. 3 help describe the portion of the forward link system and equipment according to an embodiment of the present technology.

The VSLAIS 201 manages the network operations for the communication air interface and enables the user data to couple to external network(s) 202 such as, for example, the Internet, terrestrial public switched telephone network, mobile telephone network or private server network(s) etc.

In the forward link direction, the VSLAIS 201 receives data from the external networks 202 and creates appropriate forward link user data signals under the parameters controlled by the network management system (NMS) or specific air interface(s) in operation. The VSLAIS 201 and its associated NMS additionally functions under the guidance of the CCGMIS 207 receiving management, control and configuration parameters relating to the forward link user data signals.

The VSLAIS 201 outputs the forward link user data signals and associated management and control, and/or metadata to the VUDSSBC 203 utilizing the CCDSN 209. The VSLAIS 201 is configured and operated in a similar manner to any traditional non-cloud based satellite communications air interface by the operator, wholesale service provider, and/or virtual network operator (VNO) entity.

The VUDSSBC 203 receives the forward link user data signals (and associated management and control, and/or metadata) in a single or plurality of bit stream format(s) from the single or plurality of VSLAISs 201, and packages them together within the appropriate forward link user spot beam data signals. The VUDSSBC 203 functions under the guidance of the CCGMIS 207 that controls all the specific spot beams and provides their specific configurations, such as but not limited to, the mapping of the forward link user data signals to the associated forward link user spot beam(s).

The VUDSSBC 203 outputs the forward link user spot beam data signals to the VDMMD 204 utilizing the CCDSN 209.

The VDMMD 204 creates digitized RF carrier waves in the desired RF of the forward link user spot beams, and digitally modulates and maps the bit streams according to the modulation and coding schemes determined by the VSLAIS 200 for each forward user data signal (air interface and waveform) within a forward link user spot beam data signal. The VDMMD 204 creates and outputs a forward link user spot beam digitized RF signal for each spot beam to the VPBRT 205 utilizing the CCDSN 209.

The VPBRT 205 then transports each forward link user spot beam digitized RF signal within data packets (DP) and associated metadata packets (MP) forming individual IS. The multiple IS are forwarded to the GOCFLS 206 via the CCDSN 209.

The GOCFLS 206 relays and transmits the IS to the SOCFLS 301. The GOCFLS 206 and SOCFLS 301 perform all optical laser communications physical and link layer operations. In other embodiments, high layer functionality is permitted between the GOCFLS 206 and the SOCFLS 301 to ensure maximum effectiveness in transferring the IS.

The SOCFLS 301 receives the multiple IS containing forward link user spot beam digitized RF signals. The SOCFLS 301 forwards the IS by means of the OBDNDS 302 to the OBPBRT 303.

The OBPBRT 303 receives the IS and depacketizes the DP and MP and reconstructs the individual forward link user spot beam digitized RF signals. The OBPBRT 303 passes the multiple forward link user spot beam digitized RF signals and their associated metadata to the OBDBP 304.

The OBDBP 304 performs the beamforming functions on all the forward link user spot beam digitized RF signals received from the OBPBRT 303.

The OBDBP 304 carries out its tasks on the forward link user spot beam digitized RF signals under the guidance of the CCGMIS 207 that controls the spot beams and provides their specific configurations, such as but not limited to, the size, dimensions, locations, and/or other operational parameters of the forward link user spot beams.

In other embodiments, the OBDBP 304 can carry out its tasks under the guidance of other ground based beamforming control systems to ensure desired operation and/or performance.

In other embodiments, the OBDBP 304 can carry out its tasks under full or partial guidance of an on-board beamforming control function and system and/or a combination of on-board and ground beamforming control functions.

For each forward link user spot beam digitized RF signal, the OBDBP 304 obtains, calculates, or otherwise produces the phase and amplitude coefficients for all (or a subset) of the satellite TAEs 309. The OBDBP 304 takes each forward link user spot beam digitized RF signal and creates multiple variants with their respective coefficients applied, one for each of the TAEs 309. The OBDBP 304 then sums all the individual forward link user spot beam digitized RF signals variants for each specific TAE 309 producing a unique forward link digitized RF TAE signal.

In some embodiments, the OBDBP 304 can assign different power and phase coefficients to a single or plurality of segments of the frequency bands within the forward link user spot beam digitized RF signals.

In other embodiments, alternate beamforming technologies and/or methods can be utilized including but not limited to, the use of calibration subsystems with reference remote terminals, linear, and/or non-linear algorithms.

The OBDBP 304 then passes each of the forward link digitized RF TAE signals to the OBDAC 305.

Each of the OBDAC 305 performs the conversion of the forward link digitized RF TAE signals into a respective forward link analog RF TAE signal and passes them to the TRFDS 307.

The TRFDS 307 maps the forward link analog RF TAE signal output of each of the OBDAC 305 to its specific and assigned TAE 309, which then transmits the signal.

The plurality of TAEs 309 form a multiple element antenna feed system and form spot beams as controlled by the OBDBP 304. The multiple spot beams are then received by the appropriate subscriber terminals (ST).
Return Link FIG. 2 and FIG. 3 help describe the portion of the return link system and equipment according to an embodiment of the present technology.

The RAEs 310 receive their own variant of the return link analog RF RAE signals that are transmitted by the subscriber terminals (ST) to the satellite.

Each RAE 310 distributes its specific return link analog RF RAE signal to the RRFDS 308.

The RRFDS 308 connects each RAE to a respective OBADC 306. Each OBADC 306 then converts each return link analog RF RAE signal to a return link digitized RAE signal. The OBADC 306 sends the return link digitized RAE signals to the OBDBP 304.

The OBDBP 304 takes each return link digitized RAE signal and obtains, calculates, or otherwise produces phase and amplitude coefficients for each return link user spot beam per every (or subset of) RAE and performs the computation and the summation processes to extract the return link user spot beam digitized RF signals for each spot beam.

In some embodiments, the OBDBP 304 can assign different power and phase coefficients to a single or plurality of segments of the frequency bands within the return link digitized RF user spot beam signals.

The OBDBP 304 carries out its tasks on the return link digitized RAE signals under the guidance of the CCGMIS 207 that controls the spot beams and provides their specific configurations, such as but not limited to, the size, dimensions, locations, and/or other operational parameters of the return link user spot beams.

In other embodiments, alternate beamforming technologies and management methods can be utilized including but not limited to, the use of calibration subsystems, linear, and/or non-linear beamforming algorithms.

In other embodiments, the OBDBP 304 can carry out its tasks under the guidance of other ground based beamforming control systems to ensure desired operation and/or performance.

In further embodiments, the OBDBP 304 can carry out its tasks under full or partial guidance of an on-board beamforming control function and system and/or a combination of on-board and ground beamforming control functions.

The OBDBP 304 forwards the return link user spot beam digitized RF signals to the OBPBRT 303 which utilizes IS to forward the return link user spot beam digitized RF signals to the SOCFLS 301. The OBPBRT 303 converts each return link user spot beam digitized RF signal to a unique IS with associated DP and MP. The OBPBRT 303 passes the multiple return link IS to the SOCFLS 301 via the OBDNDS 302.

The SOCFLS 301 transmits the multiple IS to the operational GOCFLS 206. The SOCFLS 301 and GOCFLS 206 carry out all optical laser communications physical and link layer operations. In other embodiments, high layer functionality is permitted between the GOCFLS 206 and the SOCFLS 301 to ensure maximum effectiveness in transferring the IS.

The operational GOCFLS 206 receives the multiple IS from the SOCFLS 301 and relays them to the VPBRT 205 via the CCDSN 209.

The VPBRT 205 receives the multiple IS and depacketizes the DP and MP to reconstruct the return link digitized RF user spot beam signals. The VPBRT 205 sends the return link user spot beam digitized RF signals to the VDMMD 204.

The VDMMD 204 digitally demodulates and demaps the return link user spot beam digitized RF signals to output the return link user spot beam data signals to the VUDSSBC 203. The VDMMD 204 operates under the guidance of the VUDSSBC 203 which in turn utilizes information from the VSLAIS 201.

The VUDSSBC 203 outputs the specific return link user data signals to the specific VSLAIS 201.

The VSLAIS 201 connects the return link user data to the coupled external network(s) 202 such as, for example, the Internet, terrestrial public switched telephone network, mobile telephone network or private server network(s) etc.

Figure 4:
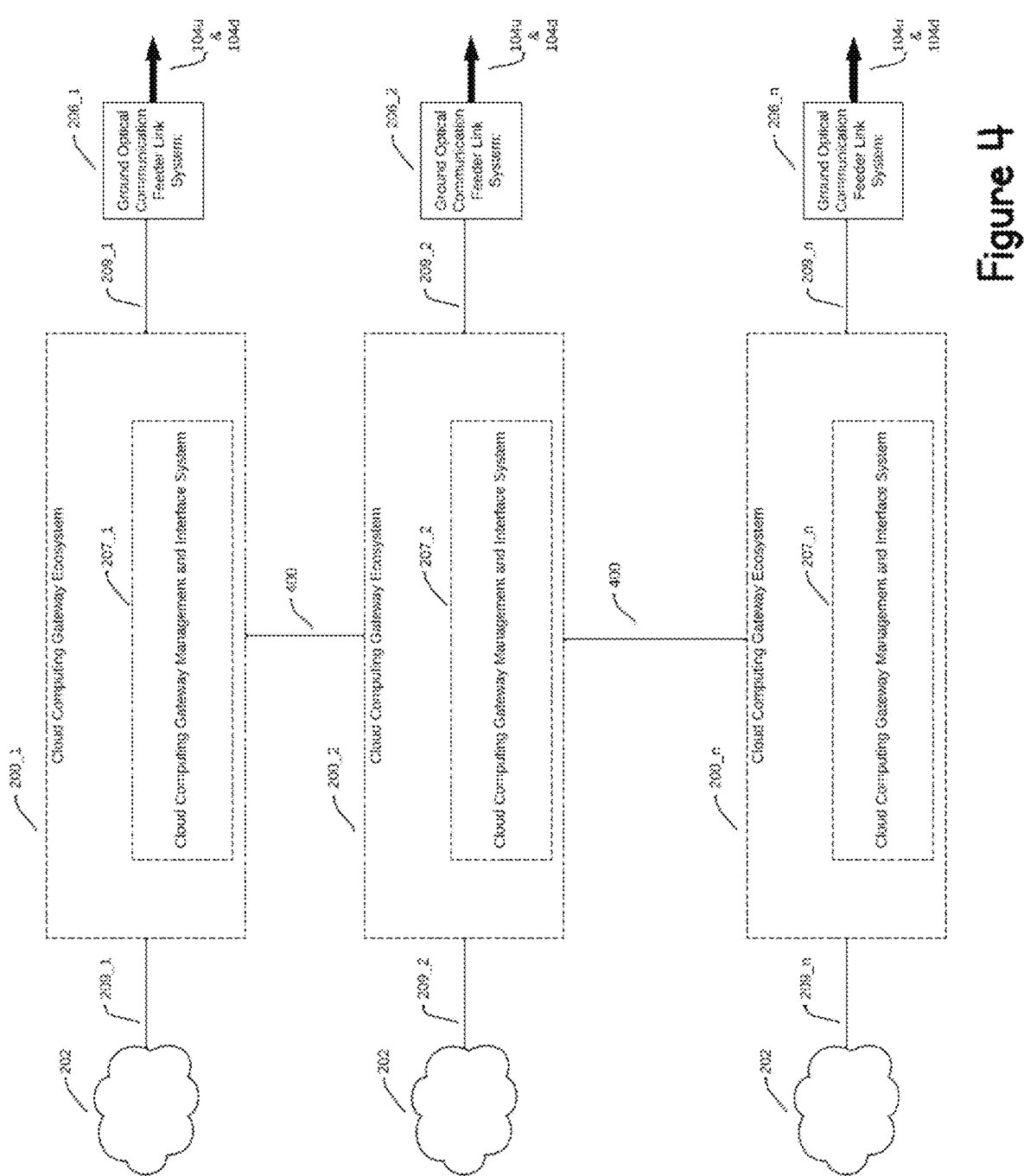
FIG. 4 shows a diagrammatic view describing a gateway switching system, according to some aspects of the present disclosure.

Gateway Switching FIG. 4 helps describe the portion of the gateway switching operation according to an embodiment of the present technology.

In some embodiments, the CCGMIS ensures the switching management, control, and operation between multiple CCGEs and their associated GOCFLSs.

The CCGMIS monitors and controls the feeder link resiliency system where a single or plurality of CCGEs and their respective GOCFLSs ensure operator specified availability of the feeder link system to the satellite (FIG. 3, 300). The CCGMIS controls when one CCGE and/or GOCFLS switches in for another in a resiliency situation.

In some embodiments all the CCGMISs (CCGMIS 207_1, CCGMIS 207_2. CCGMIS 207_n) may be online with one designated as master and the others designated as slaves. There is no limit on the total number of CCGMISs. The CCGMIS collocated with the active CCGE and its associated GOCFLS shall assume the role of master. While the active CCGE and its associated GOCFLS is in operation serving the satellite, the other CCGE's sub-systems (e.g., VSLAISs, VUDSSBC, VDMMD, and VPBRT) can be rendered dormant utilizing minimum active cloud computing resource until called upon. In this embodiment, the CCGMISs are the only active sub-system at all the CCGEs. In other embodiments a subset of CCGMISs may only be active.

The CCGMISs 207_n (master and slave(s)) maintain shared configuration and parameters and can update each other to enable a fully active CCGE as/when called upon.

In this embodiment the use of a high available, and low-latency private global network infrastructure (PGNI) 400 is utilized between the individual CDCs and their associated CCGEs. The PGNI 400 is built on a global, fully redundant, parallel high speed fiber network that is linked intra-continent and inter-content via multiple technologies, including but not limited to, trans-oceanic cables. In other embodiments, the use of other technologies and geographical coverage linking CDCs and CCGEs is permitted to allow desired level of operational metrics.

In example, CCGE 200_1 is currently active and operationally supporting the end-to-end satellite communications system, and hence CCGMIS 207_1 is the master responsible for carrying out the switching functions to another CCGE with its associated GOCFLS when resiliency requires so. When CCGMIS 207_1 determines that CCGE 200_2 will now be better placed to carry out the operation and support of the end-to-end satellite communications system, CCGMIS 207_1 instructs CCGMIS 207_2 to initiate and activate all the CCGE 200_2 sub-systems (e.g., VSLAISs, VUDSSBC, VDMMD, and VPBRTs). Once the cloud computing resources and instances are activated and enabled at CCGE 200_2, the switchover is performed. At this point CCGMIS 207_2 will assume the role of master CCGMIS and therefore the process continues.

In other embodiments, a subset of CCGEs or partial CCGEs is permitted to be initiated to allow for faster and more seamless switching between CCGEs if beneficial and/or required. Such embodiments can see a dynamic allocation of CCGE cloud computing resources being activated and deactivated in real time.

The CCGMISs can additionally control the switch and transition to another GOCFLS that is either directly connected to the same CDC and CCGE.

In this embodiment the CCGMISs utilizes information provided by the active GOCFLS and/or the SOCFLSs detailing the active optical link performance, and/or other data and information pertaining to the localized conditions of all the GOCFLSs, such as but not limited to, localized atmospheric conditions, doppler radar, satellite weather information, predictive weather analytics and modelling etc., to make the most effective decision of which of the geographically dispersed GOCFLSs and associated CCGE is best suited to serve the end-to-end satellite communications system.

In further embodiments, the inactive GOCFLSs are permitted to test their respective optical links to the satellite via the redundant SOCFLS in a round-robin and repeating operation, thus providing real-time and empirical link performance data to the CCGMISs.

Dynamic Multi Air Interface Operation

Figure 5:
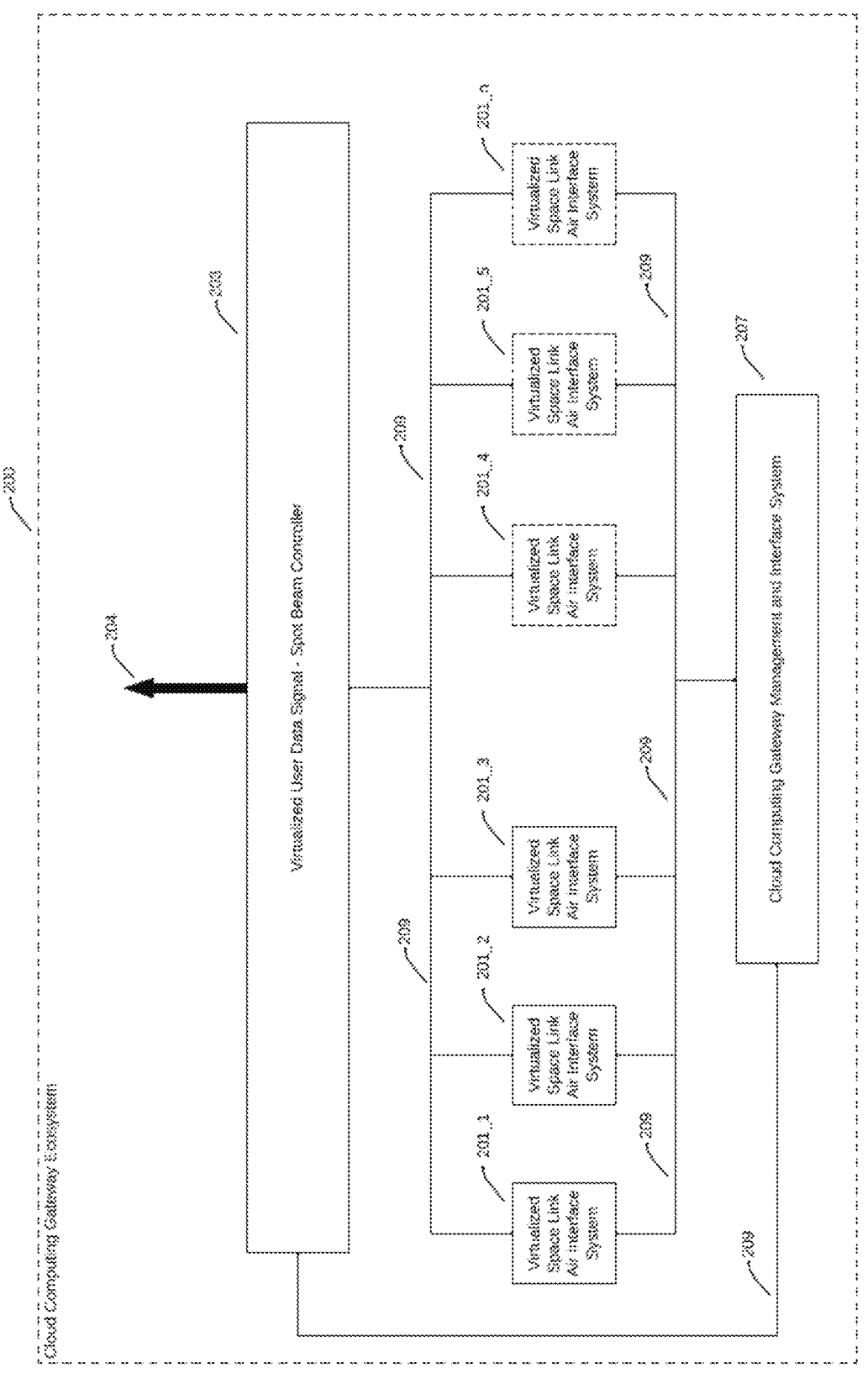
FIG. 5 shows a diagrammatic view describing the dynamic multi air interface operation, according to some aspects of the present disclosure.

FIG. 5 helps describe the portion of the dynamic multi air interface operation according to an embodiment of the present technology.

In this embodiment, the CCGE 200 supports a plurality of VSLAISs and plurality of operational configurations of VSLAISs. In example, VSLAIS 201_1, VSLAIS 201_2 and VSLAIS 201_3 are operational and VSLAIS 201_4, VSLAIS 201_5 through VSLAIS 201_n are dormant utilizing minimal or zero active cloud computing resource until called upon.

The CCGMIS 207 coordinates the activation, coordination, and deactivation of the VSLAISs under operator configured parameters, real-time metrics, and/or factors such as, but not limited to, pre-configured scheduling, available RF spectrum resource, frequency re-use rules, preconfigured variables, autonomous control variables, rule based algorithms, priorities, bandwidth demand, resource analysis, performance analysis, satellite power, artificial intelligence machine learning (AI/ML) insights, and/or other external factors and variables.

The CCGMIS 207 can orchestrate multiple VSLAIS combinations and permutations in a static, scheduled, and/or dynamic real-time environment.

The CCGMIS 207 additionally can control the VSLAIS operational parameters when active to maintain operator defined performance across the entire end-to-end satellite communications system, such as but not limited to, carrier numbers, carrier sizes, carrier parameters, spot beam assignments, beamhopping assignments, and/or RF transmit power levels.

Alternative Embodiments

Further alternatives and embodiments of his invention as described below.

In other embodiments, the communication system is permitted to operate with multiple GOCFLSs and/or a single or plurality of CCGEs simultaneously feeding a single satellite with multiple operational SOCFLSs. Within this configuration each operational CCGE and its associated GOCFLS is responsible for a subset of forward and return user spot beams. In this embodiment the subsets of the forward and return link user spot beam digitized RF signals are configured, allocated, and controlled from the master CCGMIS that has autonomy over all CCGE and GOCFLS. In this embodiment the gateway and redundancy switching is carried out with a similar operation to the first embodiment and is permitted function on a larger scale.

In other embodiments, some or all of the functions carried by the VUDSSBC may be carried out by the OBDBP with support from the CCGMIS. In this embodiment the CCGE transmits and receives forward and return user data digitized RF link signals to the satellite instead of the forward and return link user spot beam digitized RF signals. This embodiment functions in the same manner as the first embodiment but the grouping of the forward and return link user data digitized RF signals are not packaged into the specific forward and return link user spot beam digitized RF signals within the CCGE but onboard the satellite. In this embodiment the OBDBP carries out the tasks of packaging and de-packaging of the forward and return link user data digitized RF signals to/from the respective user spot beams. Further to this embodiment the packaging and de-packaging of the forward and return link user data digitized RF signals to/from the respective user spot beams may be managed and/or controlled by ground based or onboard based systems, and/or a hybrid of both.

In other embodiments, the extent and use of the VPBRT can be reduced within the CCGE (e.g., between the VDMMD and the GOCFLS where the use of a packet based radio transport protocol may be negated if/when the CCDSN is sufficient to ensure connectivity via a regular IP network that delivers a specified digitized RF integrity. Or additionally, where the VRBRT and the VDMMD VMs and instances reside on the same physical and/or localized computational hardware). In such an embodiment the VRBRT could be collocated with the GOCFLS that is geographically located away from the CCGE.

In other embodiments, the use of digitized and/or analog upconverters and downconverters are permitted in the satellite communication system (e.g., the TRDS may use an upconverter to convert intermediate frequency (IF) to desired radio frequency (RF), and the RRFDS may use a downconverter to convert from desired RF to IF). In such embodiments, the digitized signals are manipulated in IF (or another frequency) and transported by means of the VPBRT and the OBPBRT.

In other embodiments, the GOCFLS is permitted to employ an analog system to carry the transmit and receive antenna element signals between the CCGE and the satellite. In such an embodiment the transmit ISs received from the VPBRT are converted to analog RF signals via collocated digital-to-analog converter hardware incorporating an RTP and network connection to the CCDSN, and then modulated over multimode free space optical wavelengths for transmission to the satellite via the GOCFLS. Additionally, return link analog RF user spot beam signals are received from the satellite over multimode free space optical wavelengths and then converted to digitized RF signals and ISs via collocated analog-to-digital converter hardware incorporating an RTP and network connection to the CCDSN, and then passed to the VPBRT. This is not the preferred embodiment and is detailed to show the versatility of the virtualized components of the satellite communications system, if an analog GOCFLS was desired or specified. A fully analog system onboard the satellite with muxing/demuxing functionality between the SOCFLS and the OBDBP is permitted, including but not limited to, additional ADCs and DACs between the SOCFLS and OBDBP.

In other embodiments, the TRFDS, OBDAC, the RRFDS, OBADC, and the antenna system configuration can be designed to utilize components, such as but not limited to, direct microwave digitization hardware capable of input and output of RF from baseband to Ka band (and higher) and/or tunable ultra-wideband (UWB) MMiC hardware (e.g., power amplifiers, low noise amplifiers, bandpass filters etc.) capable of input and output of RF from baseband to Ka band (and higher). In some embodiments, the CCGMIS can orchestrate a dynamic multi air interface operation where a single or plurality of VSLAISs can change from one RF spectrum band (e.g., L-band) with a specific configuration of STs, to another single or plurality of VSLAISs with a different RF spectrum band (e.g., Ka-band) with another specific configuration of STs, through virtualized resource reconfiguration. Such an embodiment would allow one specific RF spectrum band to operate from the satellite at any instance, however the CCGMIS would permit switching between RF spectrum bands and ST configurations on a frequent (even sub-second) basis. Further embodiments, utilizing future hardware componentry on the satellite would permit the end-to-end satellite communication system and the CCGMIS to allow multi RF spectrum band and multi ST configurations to operate concurrently on the satellite.

In other embodiments, the use of an automatic and dynamic reconfiguration system is employed within the CCGMIS. Traditional gateway implementations today rely on extensive, bespoke and cumbersome physical RF distribution systems and infrastructure (e.g., waveguide, analog modems, upconverters, downconverters, amplifiers, filters etc.), and is commonly referred to as RF stove piping. Inflexibility and difficulty in reconfiguration are amongst the many drawbacks with traditional gateway implementations. The satellite communication system relies on a fully cloud computing virtualized gateway infrastructure, all functions are established with multiple VMs, instances, and/or other cloud computing resources supporting the different functions within the CCGE. The use of digitized RF signals and a packet based radio transport protocol between the CCGE and the satellite or plurality of satellites ensures that no physical RF distribution and bespoke infrastructure deployments are required within the CCGE. In effect, the CCGE creates a software defined gateway system, as it is physically independent of any specific piece of computational hardware and/or analog RF hardware componentry. The CCGE enables full network agility, across the full view of the satellite, through the cloud computing infrastructure that in turn provides the re-provisioning or reconfiguration ability, with the adding, subtracting or expanding of technological computational resources. The CCGE therefore allows the reconfiguration of the network architecture across the entire (or partial) resource of the satellite or fleet of satellites. The CCGMIS can reconfigure all or a sub-set of the sub-systems and/or their parameters in the cloud computing virtual environment. For example, the CCGMIS can reconfigure the whole (or a single or plurality of partial sections) of the satellite communications system, utilizing multiple VSLAIS in multiple combinations and configurations, with multiple user data signals combinations and configurations, with multiple combinations of air interface types, within multiple user spot beam combinations and configurations, therefore supporting multiple combinations and configurations of STs. Such reconfigurations can be performed on a regular or irregular basis and even down to a sub-second basis. In some embodiments, the CCGMIS can be configured to reconfigure a single or plurality of CCGEs and associated VSLAISs on a predefined basis. In further embodiments, the CCGMIS can utilize real-time intelligence, such as but not limited to, artificial intelligence (AI) and/or machine learning (ML), that can analyze instantaneous loading across the satellite communication system(s) and reconfigure the associated CCGE based on AI/ML algorithms and operator defined parameters and metrics, in a dynamic environment. In such embodiments, the CCGE provides unlimited satellite communication system (and its network topology) flexibility via the instantaneous reconfiguration of the cloud computing resource with multiple VMs and instances options. The CCGMIS can effectively create completely disparate communication networks as and when required, under the specification of operator defined parameters and metrics. This adds a totally new dimension and functionality to providing end-to-end connectivity over a satellite or fleet of satellites. This allows a single of plurality operators (of various levels and permissions) to reconfigure the entire or partial satellite communication system resource without the need for any physical hardware changes within the CCGE. The GOCFLS and associated satellite, although hardware based, are independent of the CCGE configuration and can support an unlimited number of CCGE configurations and options. Such functionality provides a single or plurality of operators the ability to maximize the total available resource and efficiency of the satellite communication system, even allowing for the over-subscription of the entire or partial resource of the satellite or fleet of satellites.

In other embodiments, the implementation of a real time dynamic coordination manager is employed within the CCGMIS. As the CCGE operates on a cloud computing virtualized infrastructure, it is therefore possible for a single or plurality of CCGMISs to have a complete view of a single or a plurality of satellites (fleet of satellites). The associated CCGMIS have full visibility of every operating configuration at every instant across the satellite or fleet of satellites. This is unlike traditional satellite communications that has an inherent highly fragmented physical gateway networking and RF infrastructure, in which there is no ability to have any real-time detailed oversight across a single satellite let alone a fleet of satellites. Coordination agreements between varying fleet operators have been relatively simple to implement with widebeam (non-spot beam) satellites. With HTS, VHTS, VVHTS and UHTS this has/will prove to be far more challenging, and near impossible, particularly with flexible satellite communication systems incorporating traditional gateway implementations and utilizing dynamic beamforming. The CCGMIS knows what capacity (spectrum and power) is being transmitted and received to/from each of the user spot beams at any point in time and knows the user spot beams' specific configurations. The CCGMIS can then automatically manage all real-time coordination between adjacent satellites operated by the same fleet operator. In other embodiments, where there is a plurality of fleet operators, each operator's CCGMIS are configured to communicate with each other and mange real-time coordination activities. In further embodiments an independent or master CCGMIS is employed to manage all real-time coordination activities. The CCGMIS can map coordination agreements between varying fleet operators and then ensure that any and/or all instantaneous configurations are compliant and adhere to the agreements without any manual intervention. In other embodiments, the independent or master CCGIS can function as an intermediary allowing one fleet operator to forgo its higher level of priority on its satellite to another fleet operator's satellite. This would incorporate a prior arrangement between the two respective fleet operators allowing the fleet operator operating under a lower priority basis to transmit at higher power levels on its satellite when it is determined by the CCGMIS as to not cause disruption to the higher priority fleet operator's adjacent satellite.

In other embodiments, an automatic tracking, identification, and mitigation of RF interference system can be incorporated into the CCGMIS. This function will allow the CCGMIS to provide real-time monitoring, management, and rectification of RF interference from faulty or rogue STs (or other sources) and/or the identification and/or rectification of deliberate and malicious jamming of the RF signals between the STs and the satellite. The CCGMIS coordinates the VDMMD and/or the (OBADC and/or OBDAC systems for digital signal processing techniques to carry out such tasks, whilst the CCGMIS can utilize intelligent software to determine interference and the source of it. Other embodiments where other sub-systems of the CCGE carry out these core functions is permitted.

From the foregoing, it can be seen that the present invention accomplishes at least all of the stated objectives.

LIST OF REFERENCE CHARACTERS

The following table of reference characters and descriptors are not exhaustive, nor limiting, and include reasonable equivalents. If possible, elements identified by a reference character below and/or those elements which are near ubiquitous within the art can replace or supplement any element identified by another reference character.

TABLE 1

| List of Reference Characters | |
| --- | --- |
| 100 | communications platform |
| 101 | cloud computing gateway ecosystem |
| 102 | first exemplary subscriber terminal |
| 103 | network |
| 104d | downlink |
| 104u | uplink |
| 105 | first exemplary user spot beam |
| 105d | first exemplary downlink channel |
| 105u | first exemplary uplink channel |
| 106 | second exemplary user spot beam |
| 106d | second exemplary downlink channel |
| 106u | second exemplary uplink channel |
| 107 | third exemplary user spot beam |
| 107d | third exemplary downlink channel |
| 107u | third exemplary uplink channel |
| 108 | second exemplary subscriber terminal |
| 109 | third exemplary subscriber terminal |
| 200 | cloud computing gateway ecosystem (CCGE) |
| 201 | virtualized space link air interface system (VSLAIS) |
| 202 | networks |
| 203 | virtualized user data signal spot beam controller (VUDSSBC) |
| 204 | virtualized digital modem, mapper and demapper (VDMMD) |
| 205 | virtualized packet based radio transport (VPBRT) |
| 206 | ground optical communications feeder link system (GOCFLS) |
| 207 | cloud computing gateway management and interface system (CCGMIS) |
| 208 | value-add products and services |
| 209 | cloud connected digital switched network (CCDSN) |
| 300 | satellite |
| 301 | space optical communication feeder link system (SOCFLS) |
| 302 | on-board digital network distribution system (OBDNDS) |
| 303 | on-board packet based radio transport (OBPBRT) |
| 304 | on-board digital beamforming processor (OBDBP) |
| 305 | on-board digital-to-analog converters (OBDAC) |
| 306 | on-board analog-to-digital converters (OBADC) |
| 307 | transmit RF distribution system (TRFDS) |
| 308 | receive RF distribution system (RRFDS) |
| 309 | transmit antenna elements (TAE) |
| 310 | receive antenna elements (RAE) |
| 400 | low-latency private global network infrastructure (PGNI) |

Glossary

Unless defined otherwise, all technical and scientific terms used above have the same meaning as commonly understood by one of ordinary skill in the art to which embodiments of the present invention pertain.

The terms "a," "an," and "the" include both singular and plural referents.

The term "or" is synonymous with "and/or" and means any one member or combination of members of a particular list.

The terms "invention" or "present invention" are not intended to refer to any single embodiment of the particular invention but encompass all possible embodiments as described in the specification and the claims.

The term "about" as used herein refer to slight variations in numerical quantities with respect to any quantifiable variable. Inadvertent error can occur, for example, through use of typical measuring techniques or equipment or from differences in the manufacture, source, or purity of components.

The term "substantially" refers to a great or significant extent. "Substantially" can thus refer to a plurality, majority, and/or a supermajority of said quantifiable variable, given proper context.

The term "generally" encompasses both "about" and "substantially."

The term "configured" describes structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

In communications and computing, a computer readable medium is a medium capable of storing data in a format readable by a mechanical device. The term "non-transitory" is used herein to refer to computer readable media ("CRM") that store data for short periods or in the presence of power such as a memory device.

One or more embodiments described herein can be implemented using programmatic modules, engines, or components. A programmatic module, engine, or component can include a program, a sub-routine, a portion of a program, or a software component or a hardware component capable of performing one or more stated tasks or functions. A module or component can exist on a hardware component independently of other modules or components. Alternatively, a module or component can be a shared element or process of other modules, programs, or machines.

A processing unit, also called a processor, is an electronic circuit which performs operations on some external data source, usually memory or some other data stream. Non-limiting examples of processors include a microprocessor, a microcontroller, an arithmetic logic unit ("ALU"), and most notably, a central processing unit ("CPU"). A CPU, also called a central processor or main processor, is the electronic circuitry within a computer that carries out the instructions of a computer program by performing the basic arithmetic, logic, controlling, and input/output ("I/O") operations specified by the instructions. Processing units are common in tablets, telephones, handheld devices, laptops, user displays, smart devices (TV, speaker, watch, etc.), and other computing devices.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

A cloud computing environment is service oriented with a focus on statelessness, low coupling, modularity, and semantic interoperability. At the heart of cloud computing is an infrastructure comprising a network of interconnected nodes.

The "scope" of the present invention is defined by the appended claims, along with the full scope of equivalents to which such claims are entitled. The scope of the invention is further qualified as including any possible modification to any of the aspects and/or embodiments disclosed herein which would result in other embodiments, combinations, subcombinations, or the like that would be obvious to those skilled in the art.

What is claimed is:

1. A digitized ground based subsystem for use in transmitting an optical feeder uplink beam to a communications platform, comprising:

a multiple element antenna array configured to receive the optical feeder uplink beam and to use the multiple element antenna feed array to produce and transmit a plurality of RF service downlink beams to a service terminal;

a cloud-computing data center (CDC);

a virtualized space link air interface system (VSLAIS) configured to accept a plurality of data streams, multiplex the data streams, and produce a plurality of user data signals;

a virtualized user data signal-spot beam controller (VUDSSBC) configured to accept the user data signals from the VSLAIS and combine subsets of the user data signals into a plurality of user spot beam signals;

a virtualized digital modulator and mapper configured to accept the user spot beam signals from the VUDSSBC and convert each to a digitized RF user spot beam signal;

a virtualized packet based radio transport (VPBRT) configured to accept the digitized RF user spot beam signals from the VUDSSBC and the virtual digital modulator and mapper, and packetizes in a plurality of information streams for multiplexing and transmission over a digital packet switched network;

a ground optical communications feeder link system (GOCFLS) configured to accept the digitized RF user spot beam signals in packetized form from the VPBRT and transmit the digitized RF user spot beam signals to the communications platform; and a communications platform with on-board digital beamforming processor (OBDBP) configured to accept the digitized RF user spot beam signals from the VUDSSBC and virtualized digital modulator and mapper, obtain or otherwise produce phase and amplitude coefficients, and output a plurality of digitized RF transmit antenna element signals in dependance of the plurality of the digitized RF user spot beam signals and phase and amplitude beamforming coefficients.

2. The subsystem of claim 1 further comprising:

a cloud computing gateway management and interface system (CCGMIS) configured to orchestrate (configure, coordinate, control, and/or monitor) a single or plurality of ground based subsystems located at a single or plurality of cloud-computing data centers (CDC).

3. The subsystem of claim 1, further comprising:

the CCGMIS configured to orchestrate (configure, coordinate, control, and/or monitor) a single or plurality of communications platforms.

4. The subsystem of claim 2, further comprising:

the cloud computing gateway management and interface system (CCGMIS) configured to monitor the GOCFLSs performance and dynamically orchestrate the ground base subsystem, and the switching operations of the ground base subsystem between different CDCs and GOCFLSs supporting the communications platforms.

5. The subsystem of claim 3, further comprising:

the CCGMIS configured to utilize information pertaining to the localized conditions of the GOCFLSs, comprising one or more components selected form the group consisting of;

localized atmospheric conditions, doppler radar, satellite weather information, predictive weather analytics and modelling.

6. The subsystem of claim 2, further comprising:

the CCGMIS configured to permit both static and/or dynamic operation of the end-to-end communication systems.

7. The subsystem of claim 2, further comprising:

the CCGMIS configured to permit support a single or plurality of operators.

8. The subsystem of claim 2, further comprising:

the CCGMIS configured to orchestrate a scheduled and/or dynamic operation of a plurality of VSLAIS between active, dormant and/or modified states.

9. The subsystem of claim 2, further comprising:

the CCGMIS configured to utilize inputs comprising one or more components selected form the group consisting of: pre-configured scheduling, autonomous control variables, rule based algorithms, resource analytics, artificial intelligence machine learning (AI/ML).

10. The subsystem of claim 2, further comprising:

the CCGMIS configured with a plurality of communications platforms' inter-coordination agreement parameters to monitor and control the user spot beam RF frequency and power coordination across the plurality of the communications platforms.

11. The subsystem of claim 2, further comprising:

the CCGMIS configured with a plurality of subsystems utilizing core cloud computing resources that are provided at a cloud-computing data center (CDC) comprising one or more components selected form the group consisting of: a computer, a server, a database, a network, an analytics based software application, a control system, intelligence capabilities, and on-demand web-based services.

12. The subsystem of claim 2, further comprising:

the CCGMIS configured to permit the integration and operation with external systems utilizing a mixture of private and/or public cloud and/or other on-premises based management systems.

13. The subsystem of claim 2, further comprising:

the CCGMIS configured to track, identify, and/or mitigate interference and/or jamming of the RF signals between the subscriber terminals (STs) and the communications platform.

14. The subsystem of claim 2, further comprising:

the CCGMIS configured to operate with the forward link associated with a corresponding return link.

15. The subsystem of claim 1, wherein said communications platform further comprising;

a space optical feeder link system (SOCFLS) configured to accept digitized RF user spot beam signals in packetized form from the ground optical communications feeder link system (GOCFLS);

an on-board digital network distribution system (OBDNDS) configured to accept the digitized RF user spot beam signals from the SOCFLS and perform packet based switched networking functions aboard the satellite;

an on-board packet based radio transport (OBPBRT) configured to accept the digitized RF user spot beam signals in packetized form from the OBDNDS that de-multiplexes and de-packetizes information streams and forwards to the OBDBP;

a plurality of on-board digital-to-analog converters (OB-DAC) configured to accept digitized RF transmit antenna element signals from the OBDBP, and converting to a plurality of analog RF transmit antenna element signals;

a transmit RF distribution system (TRFDS) configured to accept the analog RF transmit antenna element signals from the OBDAC, and distribute through a plurality of analog RF chains; and a plurality of transmit antenna elements configured to accept a single analog RF transmit antenna element signal from the TRFDS to produce and transmit the plurality of RF service downlink beams to service terminals.

16. The subsystem of claim 15, wherein said communications platform further comprising:

an OBDAC configured to support operation across multiple RF spectrum bands;

a TRFDS configured to support operation across multiple RF spectrum bands;

a plurality of transmit antenna elements configured to support operation across multiple RF spectrum bands; and an antenna configured to support operation across multiple RF spectrum bands.

17. The subsystem of claim 16, further comprising:

a cloud computing gateway management and interface system (CCGMIS) configured to orchestrate a scheduled and/or dynamic operation of a plurality of VSLAISs of various RF spectrum bands between active, dormant and/or modified states.

18. The subsystem of claim 15, wherein said satellite further comprising:

an on-board analog-to-digital converters (OBPADC) configured to support operation across multiple RF spectrum bands;

a receive RF distribution system (RRFDS) configured to support operation across multiple RF spectrum bands;

a plurality of receive antenna elements configured to support operation across multiple RF spectrum bands; and an antenna configured to support operation across multiple RF spectrum bands.

19. The subsystem of claim 15, further comprising:

the service terminals (STs) configured to support multiple RF spectrum bands.

20. The subsystem of claim 17, further comprising:

the communications platform and CCGMIS configured to support multi RF spectrum band and multi ST configurations operating within an intermittent switching or concurrent modes.

* * * * *